US012769025B2

(12) United States Patent
Plummer et al.

(10) Patent No.: US 12,769,025 B2
(45) **Date of Patent: *Oct. 20, 2026**

(54) TECHNIQUES FOR DYNAMIC OBJECT DETECTION

(71) Applicant: RaySecur, Inc., Westwood, MA (US)

(72) Inventors: William Dean Plummer, Somerset, MA (US); Charles McAlister Marshall, North Andover, MA (US); Francois Berthiaume, Quebec (CA); Linda Marchese, Quebec (CA); Marc Terroux, Quebec (CA); Alexander Georg Sappok, Newton, MA (US)

(73) Assignee: RaySecur, Inc., Westwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/340,588

(22) Filed: Sep. 25, 2025

(65) Prior Publication Data

US 2026/0023191 A1 Jan. 22, 2026

Related U.S. Application Data

(63) Continuation of application No. 18/135,511, filed on Apr. 17, 2023, now Pat. No. 12,455,394.

(60) Provisional application No. 63/332,458, filed on Apr. 19, 2022.

(51) Int. Cl.

| | |
|---|---|
| ***G01V 8/00*** | (2006.01) |
| ***G01V 8/22*** | (2006.01) |
| ***G01V 8/26*** | (2006.01) |

(52) U.S. Cl.
CPC ................ *G01V 8/005* (2013.01); *G01V 8/22* (2013.01); *G01V 8/26* (2013.01)

(58) Field of Classification Search
CPC ............. G01V 8/005; G01V 8/22; G01V 8/26
See application file for complete search history.

(56) References Cited

U.S. PATENT DOCUMENTS

| | | | |
|---|---|---|---|
| 4,454,605 A | 6/1984 | De Lucia | |
| 6,815,683 B2 | 11/2004 | Federici et al. | |
| 10,247,842 B2 | 4/2019 | Marchese et al. | |
| 11,257,257 B1 | 2/2022 | Panosian et al. | |
| 11,300,699 B2 | 4/2022 | Marchese et al. | |
| 11,852,772 B2 | 12/2023 | Marchese et al. | |
| 12,455,394 B1 * | 10/2025 | Plummer | G01V 8/005 |
| 12,480,887 B1 | 11/2025 | Marchese et al. | |
| 2002/0046995 A1 | 4/2002 | Chang et al. | |
| 2004/0000999 A1 | 1/2004 | Turner et al. | |
| 2004/0065831 A1 | 4/2004 | Federici et al. | |

(Continued)

*Primary Examiner* — Kristy A Haupt
(74) *Attorney, Agent, or Firm* — Nields, Lemack & Frame, LLC

(57) ABSTRACT

There is provided an object scanning apparatus. The object scanning apparatus may include a THz source emitting a THz beam; an optical system for directing the THz beam; a zone for inspecting objects wherein the optical beam interacts with the object; a motion device for changing the spatial or temporal interaction of the object and optical beam; at least one transducer, the at least one transducer including an imaging transducer for converting the optical beam energy after interaction with the object to an electronic image; and a processor for performing processing of the image for use in characterization of the object or its interior contents or composition.

18 Claims, 10 Drawing Sheets

(56) References Cited

U.S. PATENT DOCUMENTS

| | | | |
|---|---|---|---|
| 2006/0056586 | A1 | 3/2006 | Uetake et al. |
| 2008/0231808 | A1 | 9/2008 | Van de Velde |
| 2013/0170611 | A1 | 7/2013 | Beckmann et al. |
| 2013/0229511 | A1 | 9/2013 | Oostendorp et al. |
| 2014/0125969 | A1 | 5/2014 | Jordan |
| 2015/0164327 | A1 | 6/2015 | Yaroslavsky et al. |
| 2015/0241341 | A1 | 8/2015 | Ikeda |
| 2016/0131889 | A1 | 5/2016 | Morimoto et al. |
| 2017/0012199 | A1 | 1/2017 | Sabry et al. |
| 2019/0196044 | A1 | 6/2019 | Marchese et al. |
| 2022/0196869 | A1 | 6/2022 | Marchese et al. |
| 2026/0056133 | A1 | 2/2026 | Marchese et al. |

* cited by examiner

TECHNIQUES FOR DYNAMIC OBJECT DETECTION

This application is a continuation of U.S. patent application Ser. No. 18/135,511 filed Apr. 17, 2023, which claims priority of U.S. Provisional Patent Application 63/332,458, filed Apr. 19, 2022, the disclosures of which are incorporated by reference in their entireties.

TECHNICAL FIELD

The technical field generally relates to screening of closed containers wherein the container holds one or more objects of interest for detection, characterization and identification.

BACKGROUND

Container screening is a technique which allows seeing through object carrying containers such as envelopes, small parcels, luggage, shipping containers and boxes, and thereby enabling the detection and potential identification of hidden items, such as potential or actual hazardous powders (e.g., flour, sugar, baking powder, cocaine, marijuana, tobacco and drugs), liquids (e.g. water or other imbibable fluids, liquid chemicals, biological fluids, fluid mixtures, immiscible fluids, dissolved or undissolved chemicals in liquids), electrical circuits, explosives or weapons, or drugs or narcotics, contraband, all prior to opening the container and exposing these contents. Screening may also be performed for other purposes, including determination or verification of package contents, process control, quality control, material inspection and generally applications where it is advantageous to determine what lies within or beneath the visible surface of a container, object or interface. Additional applications include determining whether or not the contents within a container have been tampered with or modified, such as modification by chemical treatment, environmental exposure, shipping or physical alteration. It is known in the art of such screening to use radiation in the microwave and millimeter wavelengths, for example between 100 μm and 10 mm (or even higher or lower wavelengths depending on application trade-offs of resolution, penetration, and so forth). The penetration depth or transmissivity of the radiation sufficient to see into or through containers of various materials and shapes is known to depend on wavelength in many applications, with longer optical wavelengths generally providing greater penetration at wavelengths longer than visible light. Such radiation will be generally referred to here as terahertz (THz) radiation.

There remains a need in the field for improving efficiencies in object detection, characterization and identification by means of an enhanced object scanning apparatus supported by algorithmic based methods, including signal processing or machine learning.

SUMMARY

According to an aspect of the invention, there is provided an object scanning apparatus. The object scanning apparatus may include a THz source emitting a THz beam; an optical system for directing the THz beam; a zone for inspecting objects wherein the optical beam interacts with the object; a motion device for changing the spatial or temporal interaction of the object and optical beam; at least one transducer, the at least one transducer including an imaging transducer for converting the optical beam energy after interaction with the object to an electronic image; and a processor for performing processing of the image for use in characterization of the object or its interior contents or composition.

According to one embodiment, an object scanning apparatus is disclosed. The object scanning apparatus comprises a terahertz source for generating a propagated optical beam; an inspection zone defined by an inspection surface and the optical beam wherein objects interact with the optical beam to create first pass radiation; a reflecting surface within the inspection zone configured to reflect at least a portion of the optical beam to create second pass radiation within the inspection zone; at least one imaging sensor configured to collect the first pass radiation and second pass radiation; and an image processor for taking data from the imaging sensor for the first pass radiation and second pass radiation, and processing the data to determine a characteristic of an object. In some embodiments, the reflecting surface has a non-uniform surface profile with height variations in a direction of the propagated optical beam that varies across the reflecting surface. In some embodiments, the apparatus comprises a second imaging sensor, the second imaging sensor configured to collect second pass radiation for processing by the image processor. In some embodiments, the reflecting surface is a sheet of material having spatial surface variations greater than $1/10^{th}$ of a wavelength of the optical beam with a peak to peak cross optical beam spacing of at least two times the wavelength. In certain embodiments, the reflecting surface is the inspection surface. In some embodiments, the object comprises a sheet of material with an object surface having a substantively uniform thickness in a direction of the propagated optical beam and spatial surface variations greater than an object thickness in the direction orthogonal to propagated optical beam. In some embodiments, the first pass radiation and second pass radiation are transmitted through paper with a wrinkled surface. In certain embodiments, the spatial surface variations in a direction of the propagated optical beam are greater than $1/10^{th}$ of a wavelength of the propagated optical beam with a peak to peak cross optical beam spacing of at least two times the wavelength. In certain embodiments, the object is contained within another object or container, and the container includes the reflecting surface.

According to another embodiment, an object scanning apparatus is disclosed. The apparatus comprises a terahertz source for generating a propagated optical beam; an inspection zone defined by an inspection surface and an in-focus region of the optical beam wherein the optical beam remains substantively in three-dimensional focus; a force application mechanism for creating a range of motion of a container within the inspection zone; an imaging sensor for collecting a time series of optical beam energy signals from the inspection zone as a function of the range of motion; and an image processor for receiving the time series and generating a series of images representing transmission or reflection as a function of the range of motion, wherein the image processor identifies a region of interest to determine a characteristic of an object. In some embodiments, the container is the object. In some embodiments, the range of motion changes a container property. In some embodiments, the apparatus further comprises an audio microphone, wherein an audio signal is correlated to the range of motion over time. In certain embodiments, the image processor determines a location within a container of an object sourcing the audio signal. In certain embodiments, the container property is a physical dimension of the outside of the container, and the time series contains data with and without a change in the physical dimension. In certain embodiments, a location of the change in physical dimension is different than the region of interest. In some embodiments, the terahertz source emits coherent radiation and the change in physical dimension changes the optical beam energy signals due to optical interference. In some embodiments, the range of motion is used by the image processor to discriminate between regions of interest within the container. In some embodiments, the range of motion is periodic and varying in period, and a feedback loop is used to generate a resonant periodic motion of the object. In some embodiments, the terahertz source emits coherent radiation, and the apparatus comprises a second incoherent terahertz source, wherein the series of images contains coherent and incoherent source emittance, and the image processor differentiates in the time series coherent and incoherent energy beam signals. In some embodiments, the region of interest is contained within an outer surface of the container, and the object has motion induced by the range of motion that is different in frequency, amplitude or phase from the outer surface. In some embodiments, the propagated optical beam comprises multiple frequencies, the imaging sensor collects the time series of optical beam energy signals from the inspection zone as a function of the range of motion and optical beam frequency, and wherein the image processor performs chemometric analysis, the chemometric analysis separating the region of interest from other container substances to determine the characteristic of the object. In some embodiments, the apparatus comprises a second actuator, the second actuator reducing relative motion of the optical beam and the container resulting from the range of motion.

According to another embodiment, an object scanning apparatus is disclosed. The apparatus comprises a terahertz source generating a propagated optical beam; an inspection zone defined by an in focus region of the optical beam wherein objects interact with the optical beam; a force application mechanism for applying a mechanical force to an object in the inspection zone; an imaging sensor configured to collect first and second optical beam images, the force application mechanism applying force for at least one of the first and second optical beam images, wherein the force is used to change a physical property; and an image processor for acquiring data from the imaging sensor and processing the first and second images to determine a characteristic of an object. In some embodiments, the object is changed in shape by application of the force. In some embodiments, the force varies in spatial position over time. In some embodiments, the force is simultaneously applied to an entire surface of the object. In some embodiments, the object has a planar surface and the force is applied to an area of the planar surface of the object that is smaller than the planar surface. In some embodiments, the force application mechanism increases or decreases air pressure. In some embodiments, the force is applied for the first image and removed for the second image, and a series of images includes images taken over time after the second image determine the object characteristic. In some embodiments, the force is applied through a mechanism substantially transparent to terahertz radiation. In some embodiments, the object is contained within a second object, and the force is applied to the object by changing a physical property of the second object.

BRIEF DESCRIPTION OF THE DRAWINGS

For a better understanding of the present disclosure, reference is made to the accompanying drawings, which are incorporated herein by reference and in which.

DETAILED DESCRIPTION

Figure 1A:
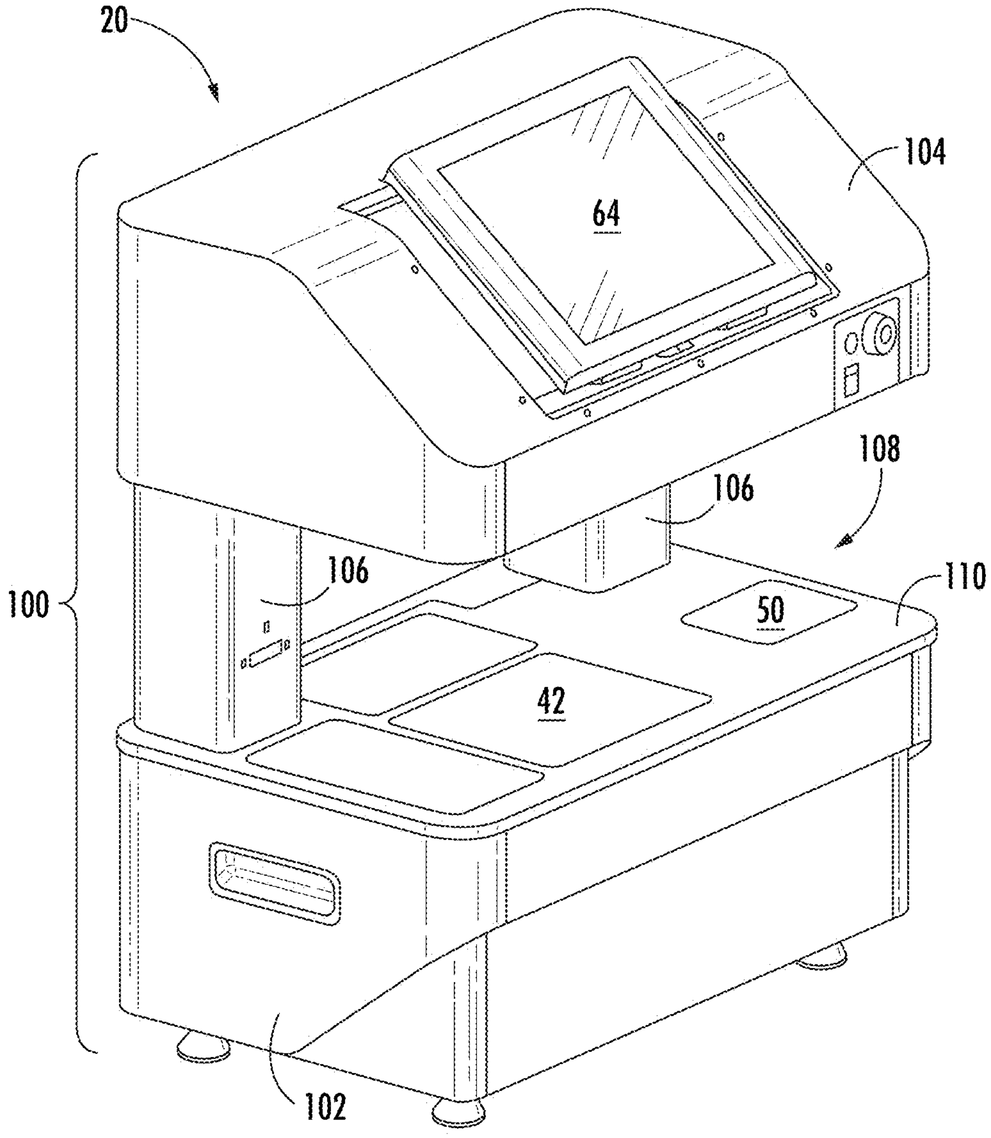
FIGS. 1A-1D show an object scanning apparatus.
Figure 1B:
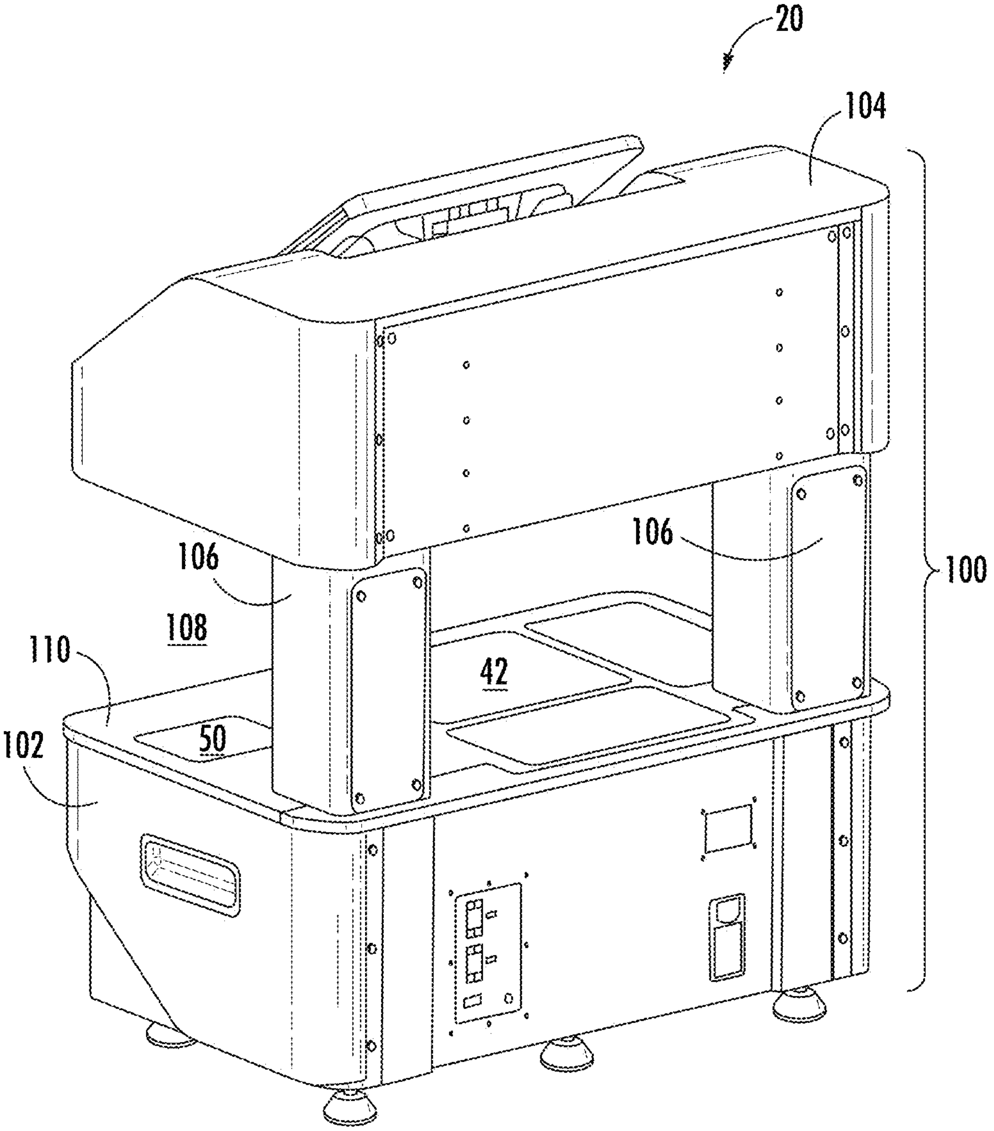

In accordance with one aspect of the invention, there is provided an object scanning apparatus such as that described in U.S. Pat. No. 10,247,842, which is incorporated by reference in its entirety, to perform the scanning of containers (or equivalently objects, including objects within containers that may themselves be containers of objects), such as mail, boxes, personal items, luggage and similar objects, using THz imaging. FIGS. 1A-1D show such an apparatus. Referring more particularly to FIGS. 1A and 1B, in some implementations, the object scanning apparatus 20 is a stand-alone device incorporating all of the components described below in a single casing 100. Preferably, the casing 100 includes a base 102 and a top housing 104 mounted over the base 102 in a spaced-apart relationship, for example using frame members such as a pair of frame posts 106. The free space between the base 102 and the top housing 104 defines an object inspection bay 108. The object inspection bay 108 is preferably large enough to allow the inspected objects to be handled within the bay. The top wall of the base 102 defines an inspection counter 110 on which the object to be inspected can be placed. The inspection counter 110 is separated into different inspection zones, including a primary inspection zone 42 and a secondary inspection zone 50. The inspection counter 110 can support an object to be screened at either one of the primary and secondary inspection zones 42 and 50. As explained further below, the inspection counter 110 allows scanning radiation therethrough at the primary and secondary inspection zones 42 and 50. An opening in the back central section of the base 102, here defined by the free space between the frame posts 106, allows for an optional conveyor belt (not shown).

Figure 1C:
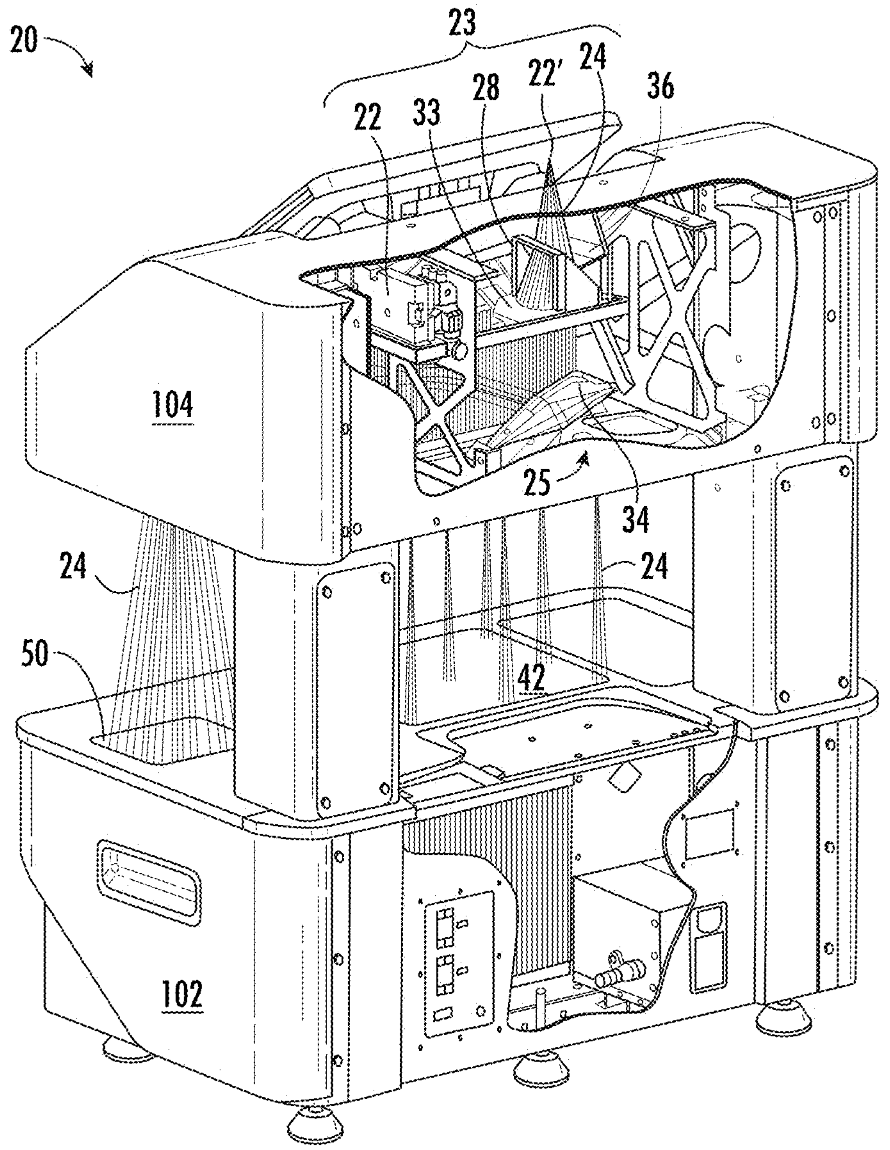
Figure 1D:
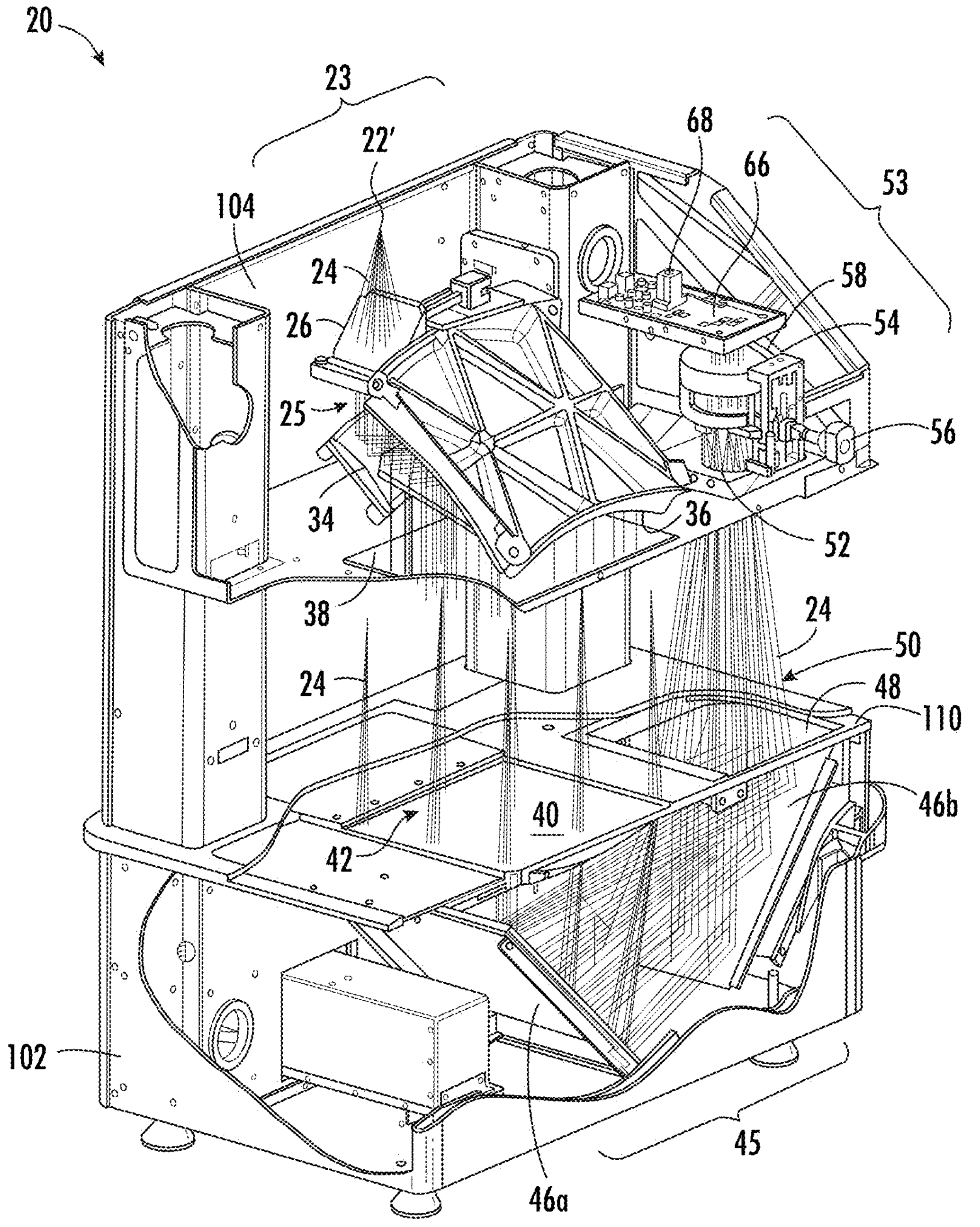

Referring to FIGS. 1C and 1D, the object scanning apparatus 20 includes a THz generating assembly 23 mounted in the top housing 104 and configured to generate an inspection optical beam 24 and project the inspection optical beam 24 into the base 102 through the primary inspection zone 42. In the illustrated embodiment, the THz generating assembly 23 first includes a THz source 22 mounted within the top housing 104 and emitting the inspection optical beam 24 (referred to hereinbelow as the "optical beam" for simplicity). In some implementations, the THz source 22 emits light at an optical frequency in the terahertz range, for example at a frequency corresponding to a wavelength between 700 μm and 1075 μm. In some implementations, the optical frequency of the inspection optical beam may correspond to a wavelength between 50 μm and 3 mm. It will be readily understood by one skilled in the art that the term "THz source" is meant to encompass stand-alone devices as well as more complex optical assemblies or systems comprising a plurality of components cooperating together to provide the desired optical beam. An example of commercially available THz sources that may be used in some implementations includes a Gunn oscillator from Sage Millimeter Inc. combined with frequency doublers and triplers from Virginia Diodes Inc. emitting power above 2 mW at a wavelength of 1.06 mm, with an antenna also from Virginia Diodes. In other embodiments, the THz source may for example be a Schottky diode or a GaAs diode emitting radiation at a suitable wavelength.

The inventions disclosed herein are applicable to radiation other than THz radiation (i.e. less than or more than 300 GHz-3 THz), and thus it should be understood that the inventions are more broadly appliable to any object penetrating wavelength wherein the object is characterized by the reflection, transmission or absorption of the radiation by the object, included the object's interior contents or composition.

The THz generating assembly 23 may next include any number of optical components in a path of the optical beam 24 for shaping, collimating and redirecting the optical beam 24. In the present example, the THz generating assembly 23 includes a beam conditioning assembly 25 within the top housing 104 which shapes and expands the transverse irradiance profile of the optical beam 24 radiated by the THz source 22. In one implementation, the optical beam 24 has a footprint between 125 mm and 400 mm. In some implementations, the beam conditioning assembly 25 may favor a uniform irradiance distribution along the transverse plane of the optical beam 24.

In the illustrated embodiment of FIG. 1C, the beam conditioning assembly 25 includes a convex mirror 34 and a concave mirror 36 successively disposed in a path of the optical beam 24. The shapes of the convex and concave mirrors 34 and 36 are preferably computed to transform the transverse spatial energy distribution of the optical beam from a Gaussian initial shape with an elliptical footprint, as typically characterizing optical beams emitted from the type of THz source used herein, to a flat-top final shape with a rectangular footprint. The local curvature of the convex mirror 34 is designed to control the intensity distribution of the optical beam. The concave mirror 36 reflects the divergent optical beam 24 from the convex mirror 34 so that, as a result, the optical beam 24 reflected off the concave mirror 36 is collimated and has a propagation axis parallel to its propagation axis prior to reflection on the convex mirror 34.

The beam conditioning assembly 25 may further include a first mirror 26 positioned at an angle of 45° with respect to the propagation axis of the optical beam 24 impinging thereon from the THz source 22 upstream from the convex and concave mirrors 34 and 36. It will be noted that for clarity, the portion of the optical beam 24 extending between the THz source 22 and the first mirror 26 is not shown, replaced instead by the virtual image 22' of the source on the side of the first mirror 26 opposite its reflecting surface 28. In some implementations (not illustrated), the first mirror 26 may be a coherence-breaking mirror having a reflective surface provided with a structured pattern (not shown). The structured pattern may for example be composed of a plurality of sloped elements distributed over the reflecting surface, each sloped element deviating the beam component of the optical beam incident thereon at a slightly different angle than the deviation imparted on neighboring beam components by neighboring sloped elements. Reflection of the optical beam by the sloped element therefore breaks the spatial coherence of the optical beam. The slope of each sloped element may be computed to deviate the beam component of the optical beam incident thereon by an angle smaller than the divergence of the optical beam. In further variants, the coherence-breaking mirror may be mounted on a rotating mount (not shown), preferably operated by a motor. In this variant, the coherence-breaking mirror is therefore rotatable about a rotation axis normal to its reflecting surface, thus breaking the temporal coherence of the optical beam reflected thereon.

In the illustrated embodiment of FIG. 1C, a collimating lens 33 is disposed on the optical path downstream the reflection on the first mirror 26. The collimating lens 33 may for example be embodied by a spherical or aspherical lens, and transforms the optical beam 24 into a slowly-diverging beam. It will be readily understood that other configurations can be considered and that additional optical elements may be provided in the path of the optical beam as part of the beam conditioning assembly without departing from the scope of the invention.

As best seen in FIG. 1D, the optical beam 24 exits the top housing 104 through an output window 38 provided underneath the top housing 104. The output window 38 is preferably made of polyethylene, glass, or other suitably transparent material. The output window 38 can advantageously protect the optical components within the top housing 104 from dust or other contaminants. In some embodiments, the output window may be omitted.

The optical beam 24 travels downward from the output window 38 towards the base 102 of the casing 100, where it reaches a primary inspection window 40 provided in the inspection counter 110 and vertically aligned with the output window 38. The space immediately above the primary inspection window 40 within the path of the optical beam 24 defines the primary inspection zone 42 for the object to be inspected. The portion of the optical beam 24 transmitted through the object to be inspected and the primary inspection window 40 therefore contains imaging information on the contents of the object, which can be processed as explained further below. In some implementations, the primary inspection zone 42 has a large imaging area. One example of an imaging area suitable for object inspection can be around 9.5 inch by 7.125 inch. The primary inspection window 40 may also be made of polyethylene, glass, or other suitably transparent material. Preferably, the primary inspection window 40 has a curvature designed to act as a field lens in order to collect more energy from the optical beam 24 transmitted through the object provided within the primary inspection zone 42. As will be explained in further details below, the primary inspection window 40 is preferably located at an imaging plane so that when an object for inspection is placed in the primary inspection zone 42 its image will be in focus on the image sensor. In one embodiment, the inspection zone is defined by the in focus region of the optical beam 24 wherein objects interact with the optical beam 24.

The object scanning apparatus 20 further includes a light redirection assembly 45 provided in the base 102 and configured to redirect the inspection optical beam 24 entering the base 102 from the primary inspection zone 42 to emerge through the secondary inspection zone 50 and project towards the top housing 104. Referring to FIG. 1D, in the illustrated embodiment the light redirection assembly 45 includes a pair of folding mirrors 46*a* and 46*b*, mounted at opposite 45° angles with respect to the plane of the inspection counter 110. The folding mirrors 46*a* and 46*b* are preferably planar mirrors. Reflection on both folding mirrors 46*a* and 46*b* redirects the optical beam 24 upwards at a location offset the primary inspection zone 42, where it exits the base 102 through a secondary inspection window 48 mounted in the inspection counter 110. The secondary inspection window 48 may also be made of polyethylene, glass, or other suitably transparent material. The space above the secondary inspection window 48 within the path of the optical beam 24 defines the secondary inspection zone 50, spanning a narrower imaging area than the primary inspection zone 42. The object to be inspected can therefore be placed in the secondary inspection zone 50 to provide a zoomed image of a portion of the object.

Referring again more particularly to FIG. 1D, after crossing the secondary inspection zone 50, the optical beam re-enters the top housing 104, which is preferably provided with an input window 52. The input window 52 may also be made of polyethylene, glass, or other suitably transparent material. In other variants the input window may be replaced by a suitably sized pass-through opening.

The object scanning apparatus 20 further includes a light collecting assembly 53 mounted in the top housing 104 and configured to receive and detect the inspection optical beam 24 projected from the base 102 through the secondary inspection zone 50. Still referring particularly to FIG. 1D, in the illustrated example the optical beam 24 is collected by an objective optics 54. In one implementation, the objective optics 54 includes a fast objective lens having an f-number (f/#) preferably lower than f/1.2. A focus adjusting mechanism is provided to adjust the focus of the light collecting assembly 53 on either the primary or the secondary inspection window 40 or 48, depending on the inspection zone being used. In the illustrated variant, the focus adjusting mechanism is embodied by a rotating handle 56 operatively connected to the objective optics 54, but it will be readily understood that other means for setting the focus, mechanically or electrically, can be used without departing from the scope of the invention.

Still referring to FIG. 1D, the light collecting assembly 53 further includes an imaging sensor 58 positioned to receive and detect the light collected by the objective optics 54. The imaging sensor 58 preferably comprises a 2D image sensor preferably sensitive in a suitable portion of the wavelength region spanning from 700 μm to 1075 μm and preferably with a resolution of at least 320×240 pixels. An example of a suitable image sensor is the one used in the IRXCAM-384THz camera module available from INO (Quebec, Canada), sensitive to the THz waveband.

As best seen in FIG. 1A, a display 64 is preferably provided to allow a user to visualize the inspection results of an object positioned in either one of the inspection zones 42, 50. The display 64 is preferably integrated in a front portion of the top housing 104 for easy viewing by a user positioned in front of the object scanning apparatus 20. The display may be embodied by a LCD screen, a touchscreen, etc. The display 64 may be mounted on the top housing 104 so as to be pivotable along at least one axis, to adapt to the position of the user in front of the object scanning apparatus 20. In some implementations, the display 64 may be omitted from the object scanning apparatus and a connection to a separate visualizing device may be provided instead.

The object scanning apparatus further includes a controller 66. The controller 66 is configured to perform a variety of control functions, such as, non-limitatively:

a. Acquiring the image data from the imaging sensor; and b. Preprocessing and formatting of the image data.

An image processor 68 is preferably provided on the controller 66 and is provided with operating software configured to perform various processing functions, such as, non-limitatively:

a. Postprocessing of the image data acquired by the imaging sensor (e.g. edge enhancement and machine learning functionality);

b. Displaying of the acquired and processed images on the display;

c. Saving the images in memory; and d. Linking the system to an ethernet or WiFi output for remote control.

Further, the controller 66 is also adapted to perform all of the functions described herein.

It will be readily understood that the controller 66 and image processor 68 may be embodied by a variety of devices, modules and combinations thereof without departing from the scope of the invention.

The object scanning apparatus 20 may be provided with any suitable user interface components providing for an easy interaction with a user. In one example, the display 64 may be embodied by a touchscreen configured to provide the user with controls and options for using the object screening apparatus 20. Alternatively or additionally, the object scanning apparatus 20 may be provided with keys, buttons, switches, pads, or any other user interface implements well known in the art.

As described above, terahertz inspection is used to localize objects by generating one or more images of the contents inside the container. As noted above, the object scanning apparatus 20 includes at least one inspection zone for viewing at least a spatial portion of the container with THz radiation, and typically, a source or transceiver for generating THz radiation, physical optics or phased source arrays for directing the radiation to the inspection zone, a sensor or transceiver for detecting the radiation after interaction with the container and any objects therein, and electronics and software for performing signal processing operations and displaying an image to an operator or passing along results to a higher level processor. Signal conditioning and image processing may also be applied to the images to aid in the detection and identification of objects within the container, the container further containing interfering materials and other objects. In one embodiment, the inspection zone is defined by an inspection surface (e.g. inspection window above) and the in-focus three dimensional region of the THz radiation formed by optics into the optical beam 24 or equivalently radiation field.

Figure 2:
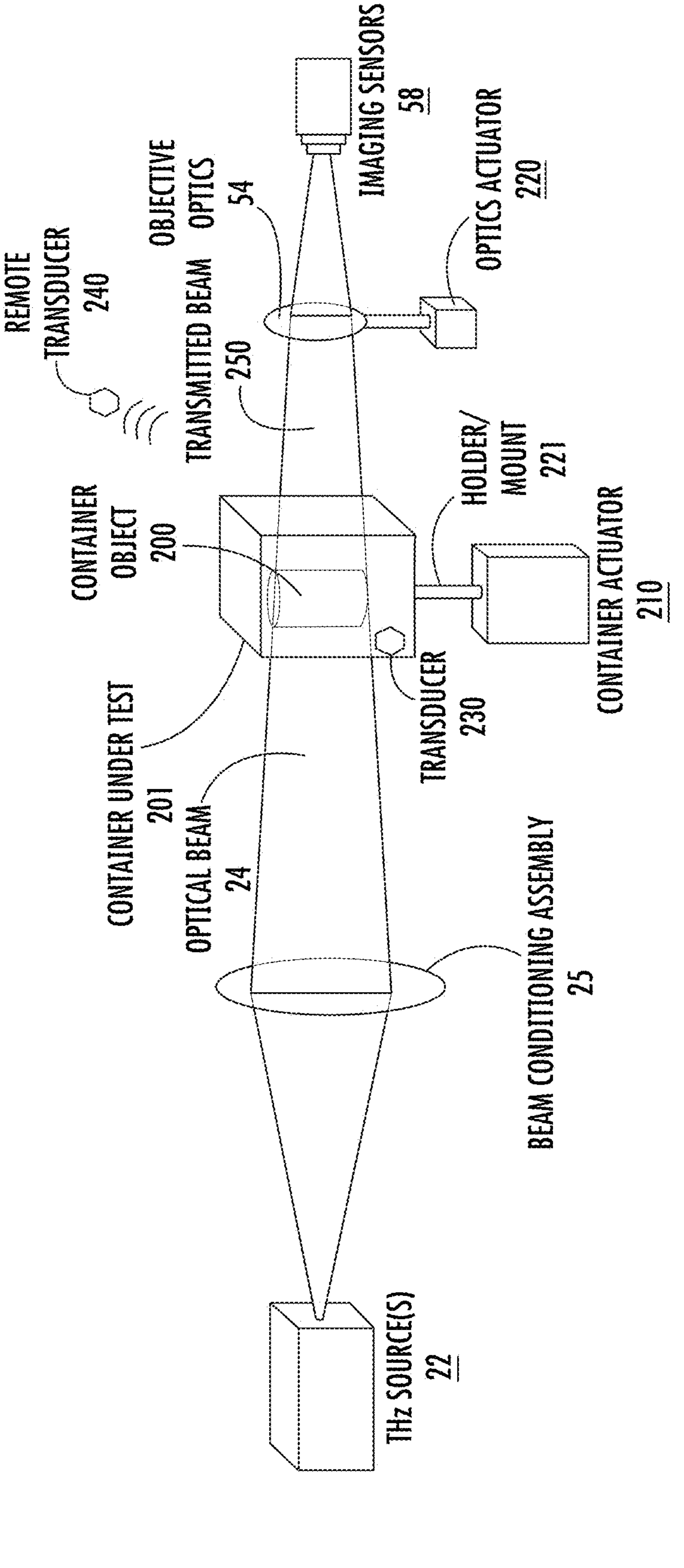
FIG. 2 shows the imaging apparatus according to one embodiment.
Figure 3:
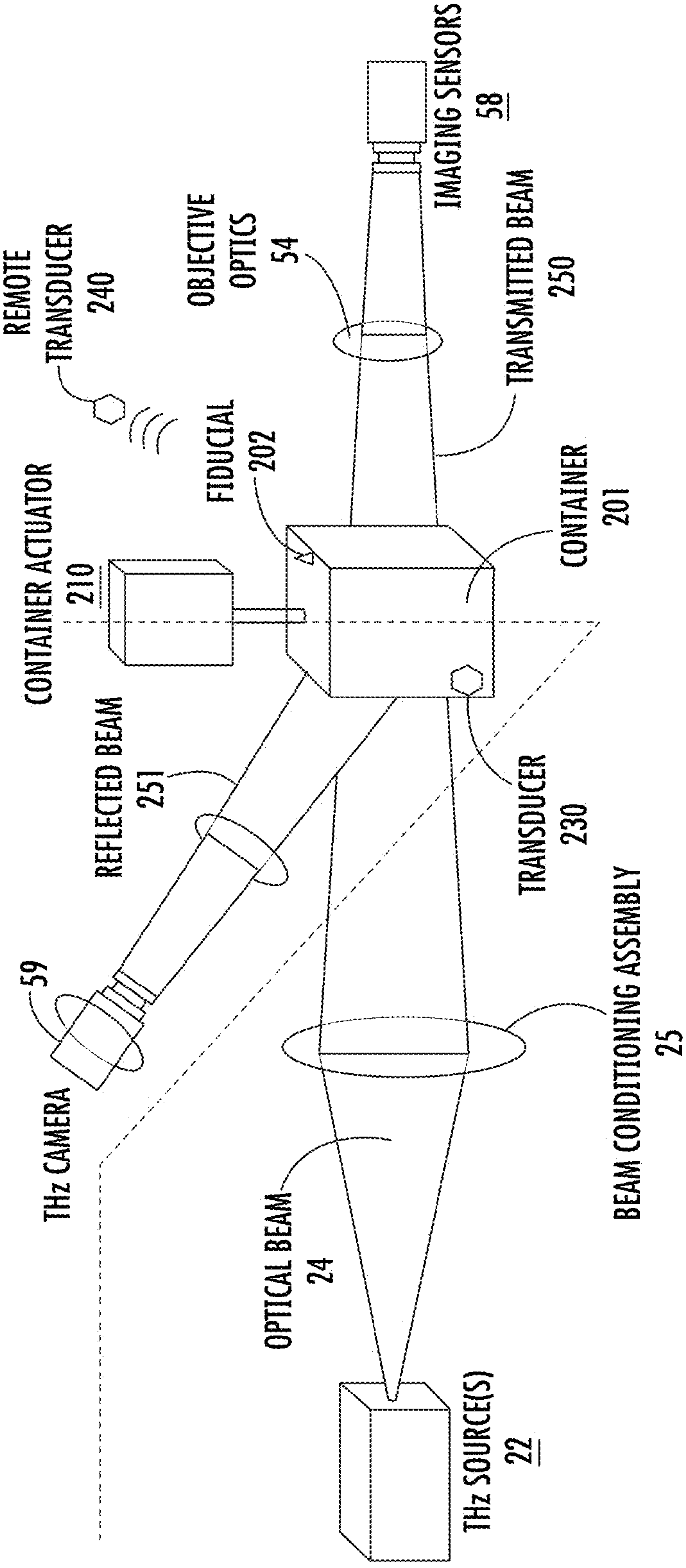
FIG. 3 shows the transmission-reflective imaging apparatus according to one embodiment.

In one embodiment, there is provided motion of the container. The motion may be relative to the radiation field within the inspection zone. FIGS. 2 and 3 show a portion of such an apparatus, specifically the optical train and motion components as part of an object scanning apparatus working in transmission with transmitted beam 250 (FIG. 2), and in reflection plus transmission (FIG. 3, with reflected beam 251 and reflection imaging THz camera 59), all with a single THz source 22. Multiple THz sources 22 and imaging sensors 58, such as THz imaging sensors, with directing or combining optics may also be used. Reflection imaging may be advantageous when container 201 or object 200 has high reflectivity and low transmission. Containers including both reflective and transmissive objects can thereby be characterized simultaneously using imaging sensors 58 and THz camera 59.

THz sources 22 may include voltage controller oscillators or phase locked loops as two examples. The generated electromagnetic energy may be at a fixed frequency, stepped or swept over one or more frequency ranges. The reflected or transmitted signal may be detected using various imaging sensors 58 (or sensors used to construct an image), including diode-based detectors, such as a Schottky diode in one example, or THz sensitive integrated circuit chips to measure either or both amplitude and phase of the signal. An amplifier may or may not be used to amplify the detected signal.

The imaging sensor 58 may be point detector, a linear array of THz transducers scanned across the optical focal plane, or a two-dimensional array. Examples of imaging sensors 58 may include microbolometers, plasmonic arrays, antennas and MIMO arrays, that is any such transducer capable of sensing THz radiation and generating a corresponding electronic signal for subsequent signal and image processing.

In FIGS. 2 and 3, the object 200 may be enclosed within a container 201. In one embodiment, object 200 or container 201 may experience physical motion, the physical motion being necessary to induce a change in a physical property of the container 201 or object 200 (e.g. motion of a fluid in container 201), or a change in relative physical properties (e.g. physical motion of the object 200 relative to the container 201). The motion may be provided by human handling, or by a container actuator 210, motor or other mechanical apparatus.

In one embodiment, physical motion of the container 201 or object 200 is combined with motion of the optical beam 24, the motion of the optical beam 24 reducing or substantively eliminating the relative motion between the container 201 or object 200, and optical beam 24. This may be advantageous, for example, to induce a physical change in the object 200 without inducing unwanted changes in the interaction of optical beam and object (e.g. diffraction artifacts, beam coherence, changes in perspective, or illumination non-non-uniformity across the object). Such motion of the optical beam 24 path may be accomplished with an actuator induced motion of an element in the path of optical beam 24 (e.g. optics actuator 220), as known in the art.

In one embodiment, there is relative motion of the container 201 and object 200, and optical beam 24, with or without physical motion of container 201 or object 200 is not required. Those skilled in the art will recognize that such relative motion can be accomplished by movement of the object 200 or by movement of the optical beam 24 from the THz source 22 to imaging sensor 58 (such as, for example, with one or more mirrors or optical elements moved using an optics actuator 220), and that any of these variants alone or in combination are various aspects of the invention.

A variety of motions across multiple degrees of freedom may be used, including but not limited to continuous motion, stepped, randomized, preprogramed, and rastered as known in the art. The motion selected may be determined by a property or type of container 201 to be scanned, or object 200 to be detected and characterized by acquiring multiple images from the imaging sensor 58 in the range of motion. Optical beam 24 motion may be comprised of changing the direction of the beam relative to the container 201 or a change of the focus of the beam. The motion may be random or periodic in nature, may have different lengths of travel, and may be varying in container orientation (e.g., 6DOF, x-y-z, pitch, rotation yaw). The motion may be pendulum like in nature to better excite resonance of container objects 200. The motion may be substantively in the direction of propagation of the optical beam 24 or substantively transverse to the direction of beam propagation. An optical flow field analysis of the image may be performed, as known in the art, to separate the relative motion of the container 201 and one or more objects 200 within the container 201. The optical flow field or other algorithmic analyses may identify one or more the following types of objects or object characteristics:

- Number of objects of interest
- A region of interest for characterization of the object or its contents
- Physical dimensions, volume, or surface profile of an object
- Object type (e.g., powder, liquid, weapon, explosive, or for commerce, identification of the objective relative to expectations)
- Object position in two- or three-dimensional space relative to the container or object scanning apparatus
- Object mass, density, or state of matter
- Number, size or characteristics of "subcontainer objects", wherein the subcontainer objects are a container within the primary container that itself contains objects (including, in one embodiment, additional subcontainer objects), and the subcontainer object may or may not be fixed in position relative to the container
- Powders, particulates or crystals and/or aggregations of such objects (individually a particulate or all together, "particulates"), collectively or individually a region of interest for characterization.
- Particulate size, density, inter-particulate adhesion, friction between particulates and its container or a characteristic of the container or subcontainer containing such particulates
- Object or interfering object spectral absorption
- Object optical properties, including spectral absorption or refractive index
- Object dielectric properties including complex permittivity, (absolute or relative) as well as loss tangent
- Object, subcontainer and subcontainer object mechanical resonance frequencies
- Liquids, liquid viscosity, Reynolds number, presence of undissolved liquid particulates, liquid volume
- Wires, wire gauge, wire dimensions, wire range of motion, wire resonance frequency, wire end points or connections
- Batteries, explosives or other energy containing or storage objects in solid, liquid or gaseous states of matter
- Freedom of motion of the object in 1 or more dimensions
- Changes in object characteristics induced by motion of the container or object, including object size or shape, and object viscosity
- Number, size or characteristics of one or more objects which may surround an object of interest (e.g., type of packing material surrounding a liquid containing vial).
- The absence of a solid or liquid substance within a spatial region of container (e.g. air pockets, voids, and bubbles)
- Number and location of subsurface defects Optical, mechanical or electronic elements may be used to determine the shape of the optical beam 24 as first generated by one or more THz sources 22 as the optical beam 24 passes into the inspection zone and is collected for sensor illumination. The characteristics of the optical beam 24 may include degree of coherence, position in the inspection zone of the 3 dimensional irradiance, cross sectional area relative to a direction of propagation, radiation wavelength or frequency, spatial amplitude distribution, frequency of amplitude or wavelength, modulation, phase, spatial uniformity, propagation direction, degree of collimation and divergence, and focal points or divergence. Characteristics may be fixed over time or object motion, or may vary with object motion to better determine a characteristic of an object, a region of interest that comprises the object or its contents, or surrounding materials.

FIGS. 1A-1D, as well as U.S. Pat. No. 10,247,842, specify an object scanning apparatus with two inspection zones along the path of an optical beam. A primary inspection zone 42 may contain a collimated optical beam 24, or a beam with a depth of field that is a significant percentage of the height of the primary inspection zone in the direction of the propagation of the optical beam 24. A container 201 moved within the primary inspection zone 42, and the contents thereof, are thus in focus while moved within the primary inspection zone 42. The secondary inspection zone 50 has a depth of field which is less than a significant percentage of the height of the secondary inspection zone 50 in the direction of the propagation of the optical beam 24, which may be advantageous in providing a zoomed image of an object 200.

In one embodiment, the characteristics of the optical beam 24 in the path between the THz source 22 and the imaging sensor 58 may be changed with motion through the use of an optics actuator 220, or other mechanical device attached to one or more of the optical components. For example, the focal point and in-focus region within the inspection zone may be a function of the position of a light collecting assembly 53. A feedback loop may be used within an electrical assembly to control the following method steps:

1. Position a container 201 within an inspection zone (either primary inspection zone or secondary inspection zone).
2. Collect data from the THz imaging sensor 58 and other transducers (e.g. remote transducer 240), if present
3. Analyze the imaging sensor 58 data and remote transducer 240 data to determine a position for an optical component (which may be upstream of the object 200, downstream from the object 200, or both) and characteristic (e.g., the beam focal point within the inspection zone)
4. With the motion device, which may be the optics actuator 220, change the optical beam characteristics within the selected inspection zone
5. Optionally repeat the preceding three steps for as many iterations as determined in the sensor analysis as found to be desired.
6. Perform signal and image processing from the collected data to determine a characteristic of the container or its contents.

In one embodiment, an optical component is not physically moved but the phase of the optical beam 24 emitted by the one or more THz sources 22 is changed to vary a characteristic of the optical beam 24 in the selected inspection zone. The phase may be changed in a feedback loop in response to motion of the container or the inspection of its contents.

The object scanning apparatus 20 may contain a secondary inspection zone 50 with a narrow depth of field due to the effective optical f/no, focal length, object distance, and other parameters as known in the art. As the object 200 moves relative to the optical beam 24, an object 200 in the container 201 then may move through the focus, presenting a series of images wherein one or more objects 200 are in focus and out of focus. Since the focus position of an optical beam 24 in space can be determined by design or calibration, motion combined with image analysis can be used to determine the size of an object 200 along the optical path or the position of the object 200 within the container 201, and a three-dimensional image of the container and object therein can be calculated and displayed.

In one method of scanning, a primary inspection zone with a wide depth of field may be used to first characterize a container 201 and select objects of interest, and a secondary inspection zone with a narrow depth of field may be used to determine position of the object 200 within the container 201 or a characteristic of the object 200. In one embodiment, a single inspection zone is used, and the optical elements configured first to image with a wide depth of field and then to image with a narrow depth of field, wherein the narrow depth of field may present an image with higher magnification. In one embodiment, one field of view may be generated from object transmission and the second depth of field image from object reflection. The different fields of view may be generated by movement or replacement of objective lens elements in the light collecting assembly 53, or by the use of separate objective and sensor light collecting assemblies 53 selected by a mirror or other beam directing optical element as known in the art (including, by way of example, a beam splitter enabling a portion of the beam to be directed to two sensors simultaneously).

A container 201 may contain one or more interfering objects (10) and objects of interest (OI). In some applications, the container 201 may be, or be indistinguishable from the object 200, as when, for example, a substance is applied to an object 200 (e.g., a drug infused envelope or a circuit board, weapon or cavity embedded in a container structure). An IO may reflect, or absorb the optical beam 24, or have a structure that masks the OI object 200 which is there, detrimental to a determination of OI characteristics. A key aspect of this invention is to use motion and a spatial-temporal combination of sensor data to discriminate between IOs that comprise the container 201 and OIs, and to detect OIs in the presence of IOs that absorb or reflect the optical beam 24. A method may further comprise a feedback loop wherein an interfering object is detected, and a motion is determined to increase a transducer signal from an OI relative to a signal from an IO. A method may further comprise a feedback loop wherein an IO is detected, and a characteristic of the optical beam 24 is changed to increase a signal from the OI relative to a signal from the IO. An IO or OI may comprise a region of interest, wherein that region of interest may be used in determining a characteristic of the object of interest.

In one embodiment, human induced motion may follow a set of motion protocols for changing container motion velocity, acceleration, frequency or orientation relative to the optical beam or object scanning apparatus.

In one embodiment, human or mechanically induced first motion may be to change a physical dimension of the inside or outside of container 201. In one embodiment, a time sequence of images may include images with and without the physical change of dimension. In one embodiment the change in physical dimension detected in a first period of time may induce a resultant detectable characteristic change of an object 200 in a second period of time. The spatial location of the physical dimension change of the container may be in a different spatial location than the resultant induced object 200 characteristic change as, for example, may be transmitted though the container 201 by structural components or pressure. The second time period may be longer than the first time period. While a change in physical dimension induced by motion is described in these embodiments, other changes in container physical properties may be induced by motion and are intended to be included within the scope of invention.

In one embodiment, a mechanically driven container motion may be induced with a container actuator 210, such as piezoelectric, pneumatic, vacuum, or hydraulic actuators, an electric motor, a solenoid, a conveyor belt, rollers such as a roller table, or an inclined plane. In another embodiment, container 201, or object 200, or IO substance motion within the container motion, may be induced by application of an external static or time varying magnetic or electric field.

In one embodiment, a transducer 230 attached to the container, such as an accelerometer or motion inducing apparatus may be used to detect changes in container acceleration due to motion of the object 200. In another embodiment, a remote transducer 240, such as a conventional optical camera, may be used to monitor the motion of the container 201 and detect changes in acceleration by processing the optical information.

The output from the container transducer 230 and/or remote transducer 240, which may be accelerometers or other motion measuring transducers, including cameras or other imaging sensors, may be used in a feedback loop to control future motion of container 201 or object 200. FIG. 2 and FIG. 3 show such a transducer 230 disposed on the container 201, but the transducer 230 may also be attached to the holder/mount 221. The transducer 230 may also be attached to both container 201 and mount 221 in a pairing of transducers. For example, accelerometers on both container 201 and mount 221 may have their signals analyzed to determine a differential signal, and such differential signal, in combination with the design and attachment of the mount 221 to the container 201, and the shape and type of container 201, may be used to determine a characteristic of the container 201 or container objects (i.e., container stiffness or flexure resulting from object motion).

In one embodiment, images from one or multiple passive or active non-THz cameras with known position relative to the inspection zone are used for measuring the container dimensions or motion, or container holder motion and position in space. The sensor or active cameras may be used in a feedback loop to control future motion of the container 201.

In one embodiment, the remote transducer 240 may be a laser range finder, which may be used for measuring the object or object holder 221 motion and position in space. The laser range finder may be used in a feedback loop to control future motion of the container 201. In one embodiment, the laser range finder optical source may be the THz optical beam where the optical beam is comprised of coherent radiation and the optical beam 24 is modulated in phase or frequency, and a sensor is configured to detect and analyze a reflected optical beam signal as known in the art of laser range finders. In another embodiment, a radar may be used in conjunction with or instead of the laser range finder.

In one embodiment, a dimensional measurement device, such as with a laser or camera, is combined with a device measuring a different characteristic, such as an accelerometer, to determine a characteristic of an object.

In one embodiment, the holder 221 with passive or active markers is used for holding the inspected object. The geometry of the holder 221 may be known by the tracking software so that images from the system can be spatially registered. The holder 221 may contain accelerometers or a camera for measuring the holder relative motion and/or position in space. A passive marker may be a barcode, fiducials, reflective surface, markings recognizable by a camera. Active markers may include electromagnetic radiation emitting capabilities (e.g., a laser) which may, for example, illuminate a camera.

In one embodiment, movement of the operator's hands are tracked by the system and object movement is deduced. Passive or active markers, fixed to the operator's hands or fixed on gloves, containing sensors such as accelerometers or cameras may also be used for inference of the object position and or relative motion in space.

In one embodiment, markers or fiducials 202 attached to the inspected container 201 are imaged by an external camera or by the THz system. Position of the inspected object is deduced from the position of the markers in the image. The fiducials 202 can be passive or active.

In one embodiment, a light projector is used to create texture patterns on the inspected container 201 (line, points, random texture) and images from one or multiple cameras or sensor(s) with known position relative to the THz system are used for measuring the object motion and or position in space.

In one embodiment, images from a camera, or stereo cameras with ranging capabilities as known in the art, are used to measure the inspected object position and or relative motion.

In one embodiment, a camera is affixed to the inspected container 201. The camera provides images from one or more fiducials or targets (passive or active target), or from the surrounding environment. Images or video created by the camera can be used to deduce the camera and or object motion and or position in space.

In one embodiment, one or more audio devices may be used to detect audio signals generated by sound waves emanating from the container 201 as a result of container motion, the sound wave frequency, phase or amplitude characteristics being correlated with the container motion. The sound waves may be the result of container objects 200 striking the container 201 or objects 200 moving relative to the container 201. The sound waves may be the result of liquids or powders moving within the container 201. Frequency, phase or time of arrival analysis of the sound waves from one or more microphones at different spatial positions may be used to determine a characteristic of the object 200, including its physical state or mass. A container 201 may contain multiple objects 200, and analysis of the sound waves may be used to determine a characteristic of more than one object or the quantity of objects. The sound wave detection may be combined with the THz wave detection and analyzed by image processor 68 to (1) in signal processing improve signal to noise ratio; (2) to determine a characteristic of the object 200; (3) locate an object 200 within a container 201; (4) determine future motion of the container in a feedback loop; or (5) correlate the motion of the object 200 with the THz image of the object 200 over time, thereby determining the object sourcing the audio signal, or isolating the source of the audio signal from other objects.

In one embodiment, the container motion may be displayed to an operator. The displayed image may be processed to show the container motion relative to the object motion. The displayed image may show motion of the object 200 while the container 201 is held as a static image on the display. The displayed image may show a static image of a moving container. The displayed image may use color, edge enhancement, motion vector arrays or other visual enhancements to aid in object identification and characterization. The information captured by the sensing apparatus can also be processed beforehand and visualized at a later time. The complete capture of image segments of interest may be automatically displayed to the operator, and the apparatus may select the entire sequence or some parts of the captured sequence for visualization or processing. Additionally, the transducer information may be correlated to the image segments to provide a full set of data. The operator may also manually add or delete markers on images used for motion analysis. In one embodiment, the measured motion of the object 200 or the absence of the detection of an object 200 or object motion may be used in a feedback loop to determine the future motion of the container 201, whether mechanically or human induced.

In one embodiment, the motion of the container 201 may be periodic or sinusoidal in nature. A vibrator attached to the container 201 or as part of the sensor apparatus platform may be used to impart a vibrating motion to the container 201. The motion may be non-periodic and designed to provide an impulse shock of varying magnitude or varying acceleration in one or more dimensions. The frequency of periodic or non-periodic motion of the container 201 may be swept, the sweeping designed to determine one or more resonance frequencies of the container 201 or object 200 using field flow analysis or other algorithmic analysis in image processor 68. The shock or motion may be applied to provide different relative motions of the object 200 and container 201, which may be determined by optical flow field analysis. A feedback loop may be used to reduce the number of possible motions, or improve determination of object characteristics. In one embodiment, the motion is periodic and varying in period, and a feedback loop is used to generate a resonant periodic motion of the object 200.

In one embodiment, the object 200 contained within an outer surface of the container 201, and the object 200 has motion induced by the motion of container 201 that is different in frequency, amplitude or phase from the container outer surface. The difference in frequency, amplitude or phase may be used by the image processor 68 or by another processing unit to determine a characteristic the object or the interaction (e.g., mounting or points of attachment) between the object and container. The characteristic may be classification of the object as powder or liquid through visual inspection or analytical analysis.

Of interest in container scanning is determining the potential presence of fluids in a cylindrical tube or shaped subcontainer. Those skilled in the art will be versed in Cooker's experiment and the body of work for using oscillating vibrations applied to an object and monitoring the damping effects as function of oscillation amplitude, input power, oscillation decay time, or changes in resonant frequency, to determine fluid viscosity. The motion of the container 201 may follow a predetermined set of motion amplitudes and frequencies to excite motion of a fluid in an object 200 comprised of a cylindrical volume or a packet containing a fluid. The object scanning apparatus may first detect the presence of a subcontainer object potentially capable of containing fluids (or particulates), and then motion may be applied to the container 201 to excite motion of a fluid (or particulates) in the container 201. The motion profile may be determined by a characteristic (e.g., volume, shape, orientation) of the subcontainer, or orientation of the subcontainer relative to the optical beam 24 or to the container 201.

A predetermined procedure may include taking a first image, inducing movement of the container 201, taking a second image, and then processing algorithmically the first and second image of a sequence to extract object characteristics. For example, the detection of particulates in a container 201 or subcontainer (e.g. flour in an envelope) may include:

1) Positioning and movement of the container to cause particulates in the envelope to move to a first spatial position (e.g. a corner or side of the container or particulate containing sub-container).
2) Positioning the container in a fixed orientation within the inspection zone.
3) Capturing a first image with the THz imaging sensor 58
4) Positioning and moving the container 201 to cause the particulates in the envelope to move to a second spatial position (e.g. a corner or side of the container 201 or subcontainer different from the first spatial position.
5) Positioning the container 201 in the fixed orientation within the inspection zone.
6) Capturing a second image with the THz imaging sensor 58.
7) Processing (e.g. differencing) the two images to detect movement, size or quantity of particulate objects within the envelope container.

The method may further include more than two spatial positions and image captures for use in the processing. The method may include low pass filtering of the sensor images to create a reference image for detection of moving particulates. It should be clear the same method could be used for fluids rather than particulates, and in general any substance that moves to different spatial positions upon the container motion. Such a substance may further take a shape along at least one dimension of the container or subcontainer (e.g. a powder that is moves to and is confined by a side of an envelope, or a fluid the partially fills a vial and moves to different positions in the vial).

Figure 4:
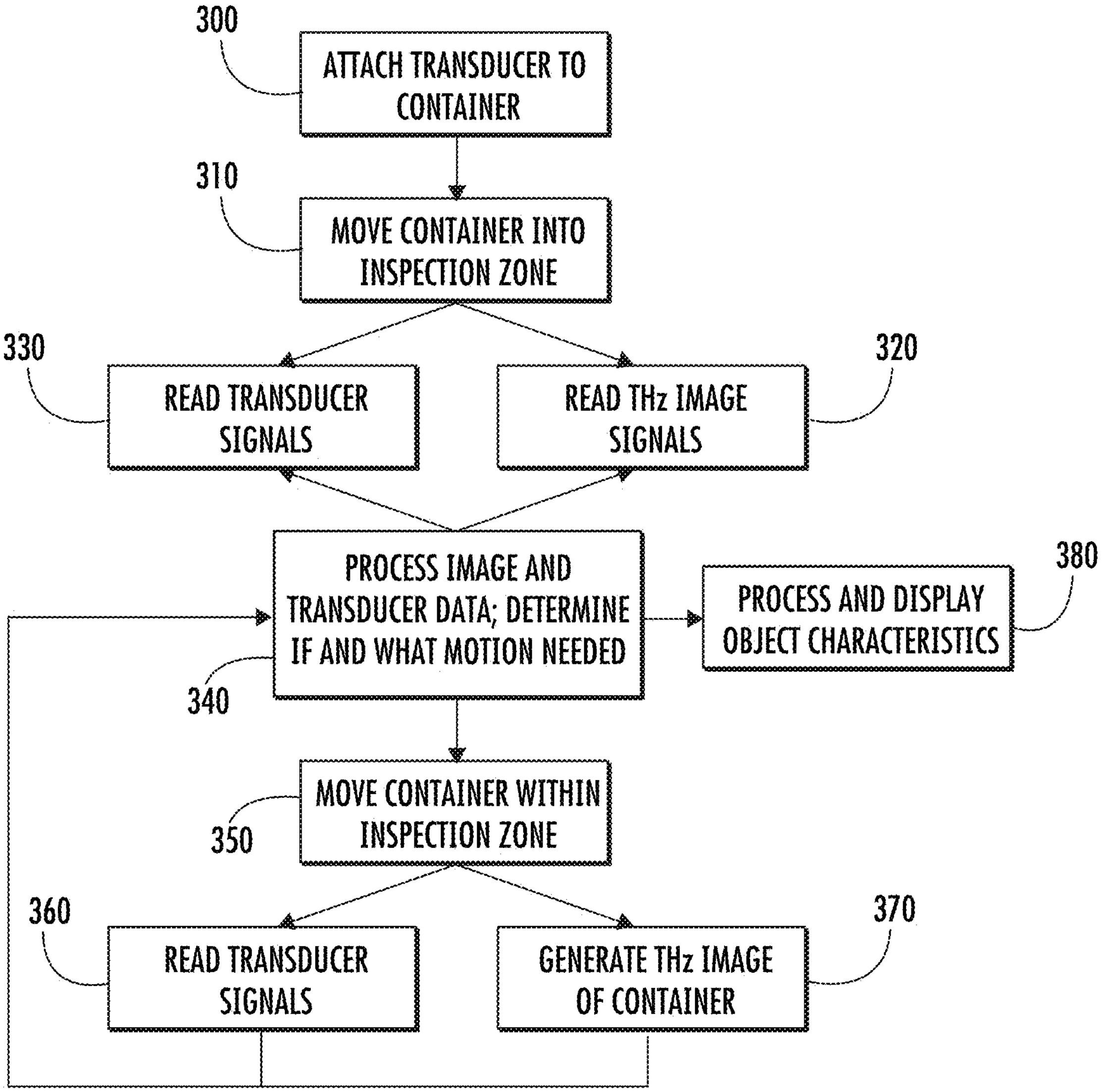
FIG. 4 shows a method of using motion to determine a characteristic of an object.

The scanning apparatus may follow a method as shown in FIG. 4, that includes at least some of the following steps:

1. Select a container 201 to be scanned.
2. Attach a transducer 230 to the container. (Box 300)
3. Attach the container 201 to a motion mount 221 and move to inspection zone. (Box 310)
4. Perform a first scan of the container 201 and collect THz image data. (Box 320)
5. Optionally collect transducer data. (Box 330)
6. Analyze the scan results and determine if a motion scan is required. (Box 340)
7. With the container actuator 210, move the container 201 within the terahertz illuminated inspection zone in a step-stop, periodic, or non-periodic fashion, and collect data from the THz sensor and transducer if present. (Box 350)
8. Collect transducer data. (Box 360)
9. Collect THz image data. (Box 370)
10. Analyze the sensor and transducer data to determine a characteristic of the transducer or object and a next motion of the container. (Box 340)
11. Optionally repeat the preceding four steps for as many iterations as determined in the sensor analysis as found to be desired.
12. Determine a characteristic of the object. (Box 380)

In one embodiment, the motion of the container 201 may be rotational in one or more degrees of freedom. The rate of rotation may be constant or vary in time. The motion of objects 200 within the container 201 under rotation may be used to determine the compressibility of objects 200 within the container 201. The relative movement of objects between their static and rotational positions within the container 201 may be used to determine one or more characteristics of an object 200.

In one embodiment, machine learning may be used to correlate object type with object motion as a function of container motion in order to better identify and characterize future objects.

In one embodiment, an electromagnetic field sensor may be attached to the object scanning apparatus, motion inducing apparatus, or container to detect electromagnetic waves induced by motion of the object, such as magnetic fields induced by the flow of current or motion of charged particles. The electromagnetic field sensor may be a coil or antenna used to measure changes in magnetic field. Both container 201 and object 200 may generate motion induced electromagnetic waves at different frequencies with discrimination between frequencies used to detect objects.

In one embodiment, a remote transducer 240, such as a camera viewing the container 201, or a transducer 230 attached to the container 201 may be used to detect changes in container surface properties (e.g., color, temperature, absorption, reflection) induced by motion of the object. An incoherent light source may be used to illuminate the container 201, and the wavelength of light may be changed over time. A coherent light source may be used to illuminate the container 201, and the remote transducer 240, in the form of an optical sensor, may be used to detect changes in container physical dimensions. In some embodiments, the remote transducer 240 may be a remote sensing spectroscopic device, which may be used to characterize the surface (or subsurface, depending on the device optical wavelength) spectroscopically to determine chemical properties. In one embodiment, the container transducer 230 may be a humidity sensor attached to the container 201 to detect changes in humidity or surface water content induced by motion of the object 200.

In one embodiment, where a coherent light source is used to measure a dimensional change in the container 201 or object 200 due to motion, sensor data from both the imaging sensors 58 and transducers 230, 240, such as a motion detector, may be used to extract and separate the induced change in the object 200 from the change in position due to the motion device. A method of measuring motion induced changes in the object 200 may have the follow steps:

1) Illuminate an object 200 (or container 201) with a coherent light source
2) Move the object 200 (or container 201) within a THz inspection zone with a motion device (container actuator 210 or human movement)
3) Collect sensor data, including THz imagery of the object 200, position of the container 201 on the motion device, and coherent light after interacting with the object 200 (e.g. reflected light as shown in FIG. 3)
4) Analysis of the sensor data to separate motion of at least part of the object 200 relative to motion of the motion device or container 201 (e.g. the differential motion of a flexing membrane in object relative to motion of the object).

In one embodiment, a radar transceiver may be attached to the container 201 to detect changes in container motion or surface properties induced by motion of the object 200. In one embodiment, an electromagnetic contact resistive, capacitive or inductive sensor may be attached to object scanning apparatus, motion inducing apparatus or container to detect electromagnetic waves induced by motion of the object. The electromagnetic contact sensor may be an ohmic sensor used to measure changes in resistance.

The THz source 22 may provide coherent or incoherent radiation at one frequency, at multiple frequencies over time, or be periodically swept in frequency. If the THz source 22 emits coherent radiation, the THz imaging sensor 58 may be used to detect changes in signal at the sensor resulting from optical interference of the radiation transmitted through or reflected off the container or objects as a result of object motion. The coherence induced signal changes may be used to characterize the container objects.

A second imaging sensor, such as a THz radiation sensor or transducer, may be used to detect the THz radiation after interacting with the container and object, the second imaging sensor located at a different spatial position on the object scanning apparatus in order to collect complementary information.

In one embodiment, information from multiple sensors or imaging sensors 58 may be combined to achieve enhanced object characterization relative to a single sensor. An optical sensor may be used to detect stationary coherence effects that interfere with object detection and then discriminate between stationary coherence induced signals and signals generated from the object. A first, second or combined sensor information may be used to differentiate between coherence effects generated by the container and object, and use the discrimination information to increase object identification and characterization capabilities.

In one embodiment, two THz sources 22, one coherent and one incoherent may be used to create differential images with and without coherence in a time series of image acquisitions in order to detect object or container features that result in optical interference measurable by the imaging sensor 58. In one embodiment, the frequency generating electronics in a single source 22 may have a first mode wherein an oscillator is free running to resulting in an effective incoherent beam in the time scale of the measurement, and a second mode wherein the oscillator is locked to generate a coherent beam. A single source with two modes may be advantageous in that a first image with coherence and second image without coherence can be processed to detect optical interference generating object features in the absence of any other change between the two images (i.e., no motion).

In another embodiment, higher order harmonics may be utilized from a single THz source.

In one embodiment, the THz source 22 may be an array of THz transmitters on a single die, as for example been demonstrated in the art using CMOS technology. Two or more emitters in the array may then be used to create motion of the optical beam 24 relative to the object 200 resulting in image processed or differential images.

In one embodiment, motion of the container 201 or object 200 may be used to improve the effective field of view or the imaging resolution of the object scanning apparatus by combining images of the container 201 or object 200 with different container 201 or object position.

In one embodiment, motion in greater than 2 degrees of freedom of the container 201 or object 200 may be used to generate a three dimensional image of the container and the object.

In one embodiment, a progression or hierarchical testing method of object identification and characterization may be employed. The testing method may include combining information from one or more sensors or transducers or degree of motion in a predetermined sequence. The testing method may include using the results based on the data from one sensor to determine the next sensor test or container motion to be performed. For example, a static imaging test may be employed to determine an object 200 in a container 201 (e.g., the type of shipping packing material) and movement under rotation of a second object may be used to calculate a property of the second object (e.g., mass) from a known property of the identified first object (e.g., compressibility). The property may be a relative property of the two objects (e.g., a dense solid object versus soft packing material).

The number of steps in the testing method may be changed depending on the data from one or more sensors and an assessment of the probability of "threat" based on an analysis of such data. In this manner, high speed scanning of multiple items may be performed using a first sensor and mechanical motion in at least one dimension, and if a potential object of interest is identified, additional sensor measurements with or without additional motion characteristics may be performed to further characterize the object of interest.

In one embodiment, multiple THz imaging sensors 58 and THz sources 22 are used simultaneously to image the inspected object. The multiple imaging sensors 58 and THz sources 22 may be positioned in a circular fashion so that a tomographic-like reconstruction of the object in movement can be performed. Information from THz sensors and external non-THz sensors can be combined to the reconstruction and analysis of motion.

Spectroscopic Detection

In one embodiment, spectroscopic characterization of the container 201, interfering objects and objects of interest may be performed. Penetration of complex materials by spectroscopic techniques may be challenging when the optical beam 24 interacts with different materials as it passes through, is absorbed by, and is reflected off the materials. This technique may be further complicated when the optical beam 24 is coherent due to diffraction and optical interference. However, in some embodiments, coherence may also be used to enhance two and three dimensional characterizations through many techniques known in the art, such as in tomography.

In one embodiment, a series of sensor data over time is captured during motion of the container 201 at multiple optical beam frequencies in a three dimensional inspection zone defined by an in focus optical beam, and, in one embodiment, an inspection surface. As known in the art, the THz source 22 may emit at multiple frequencies simultaneously or sequentially over time. The depth of field of the optical beam 24 is at least as large as the object 200 and its motion, thereby enabling in focus imaging throughout the range of motion. For each position, spectroscopic analysis is performed to generate a spectroscopic two or three dimensional view of the container 201 or its contents. An object of interest in the container 201 may then be identified. The series of views at the different positions of the container 201 may then be analyzed to determine spectroscopy content in spatial regions with and without the object 200, and then to further process the images to remove the spectral signatures of the container 201 and interfering objects to isolate the spectral contribution of the object of interest from substances and objects not of interest, even though in some positions of the container 201, both the object of interest and interfering substances are both along the same path of the optical beam 24. Additional processing of the images or chemometrics may then be used to determine a spectroscopically determined property of the object 200.

In one particular example, the inspection zone may be configured to form a microwave resonant cavity. The cavity need not be fully-enclosed and may have one or more openings in one example, where the dimensions of the openings define the cut-off frequency for cavity measurements. Monitoring changes in cavity resonances may be correlated to spatial variations in the electromagnetic field within the cavity. Variations in the dielectric properties of the container and OIs may be characterized by monitoring changes in the cavity resonance response which may include changes in frequency, phase, or amplitude of the of resonance curves, in addition to derivatives thereof, for example, cavity quality factor Q, or the area under one or more regions of the resonance curves, in either reflection, transmission, or reflection and transmission. In one example monitoring changes in the full S-parameter measurements, or a subset, may be utilized to characterize the container and/or OIs.

As described above, data, in the form of images, transducer data, and other information, is used by the image processor 68. In other embodiments, the object scanning apparatus 20 generates the images and data described herein and provides that information to another processing unit for further processing.

Surface, Subsurface and Cavity Profile Detection

Figure 6:
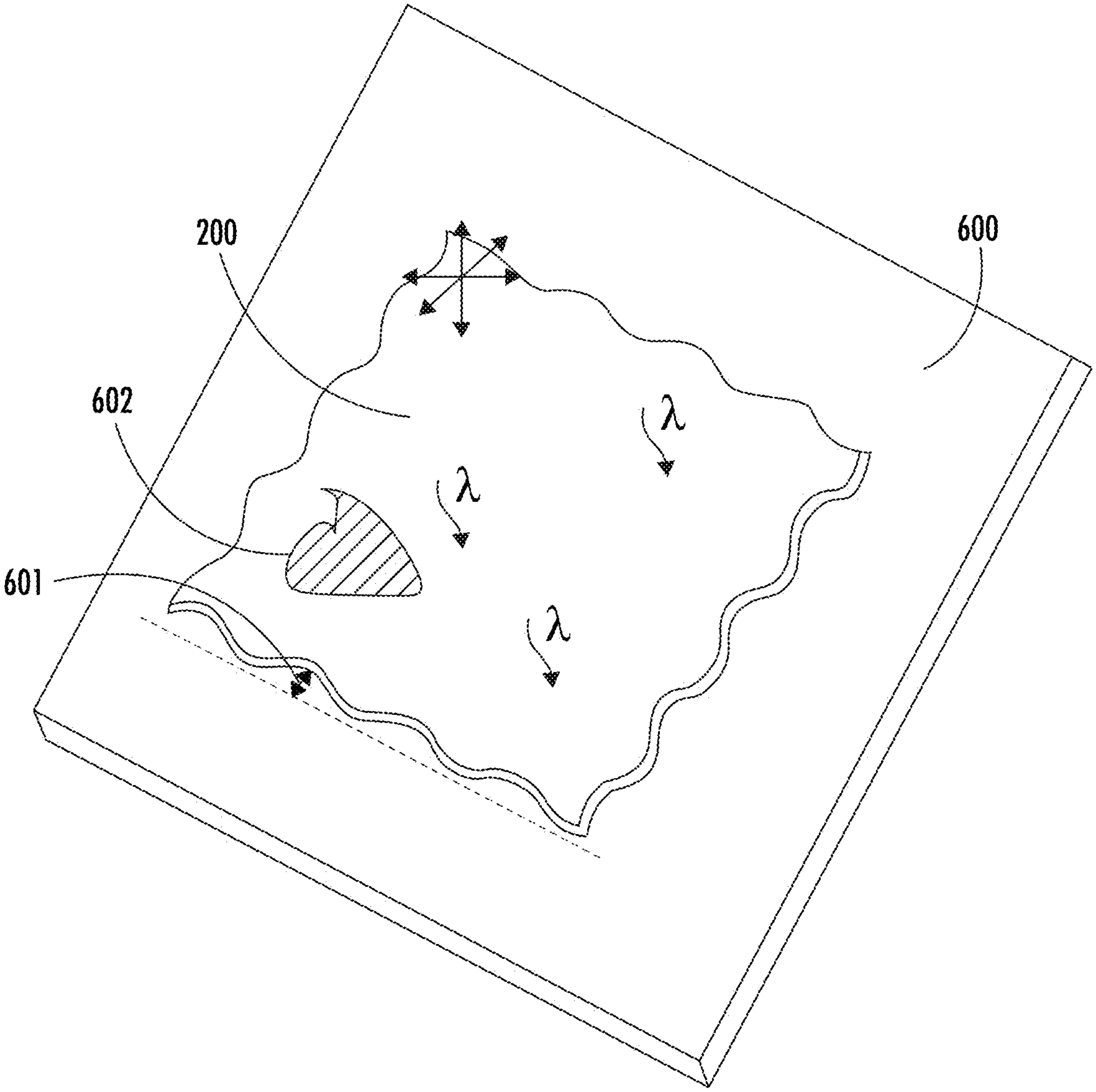
FIG. 6 shows wrinkled object detection.

FIG. 6 illustrates one application of the invention. One object 200, within a container or individually, may have a non-uniform surface, either periodic or random in nature. The non-uniform surface may be on one side of the object 200 or multiple sides, including opposing sides where the non-uniformity is substantially the same and aligned on the two sides, as would be expected for a layer of material with a two-dimensional extent and wrinkle height much larger than its thickness. By way of example, consider a sheet of material that has been moistened or soaked with a liquid, and dried (e.g. a drug infused paper). When certain materials are exposed to liquids, for example when natural fiber based fabrics and papers are exposed to water, the liquid may penetrate the molecular structure resulting in a changed molecular matrix, volume, or conformation that result in physical changes once the liquid is removed (e.g., resulting wrinkles when water soaked paper is dried). A drug treated or infused paper, or paper soaked with a chemical substance and dried, may have a wrinkled or nonuniform surface as illustrated in FIG. 6. Treated papers may include K2, K3, spice, synthetic cannabinoids, suboxone, LSD strips, THC, pesticides, RAID pesticide, and other chemicals. In one embodiment, wrinkled material is a substance with one or more surfaces that have a spatial profile where the normally flat x-y surface of the material has changes in "vertical" height z that are greater than $1/10^{th}$ of a wavelength of the optical beam 24, and with a peak to peak "horizontal" x-y spacing of the "wrinkles" of at least 2 times the optical beam 24 wavelength. For example, for an optical beam of at 300 GHz or 1 mm wavelength, wrinkles on the surface would exceed 0.1 mm in height with at least 2 mm spatially between wrinkle peaks.

Different combinations of liquids and soaked object 200 have different properties and can be used to characterize a wrinkled material, the liquid, residual substances 602 after drying, or the environment. By way of example, water soaking cellulose paper creates wrinkles while oil soaking cellulose paper has less substantive or no wrinkling, due to oil's reduced affinity to cellulose. In this manner, characterization of paper for the presence of wrinkles and residual substances 602 can be used to determine if the paper was water or oil soaked. A substance dissolved in or otherwise carried by the liquid may remain on the surface of the material or paper, or impregnated within the material or paper, after evaporation, drying, partial evaporation, or otherwise removal of some or all liquid. Spatial non-uniformity of the residual substance 602 across the surface may be correlated with the spatial distribution of wrinkles, and the object scanning apparatus may use one method to detect the substance density (i.e. detection of differential absorption across the object (e.g. paper), and a second method to detect wrinkles across the surface (e.g. coherent beam differential transmission or reflection), and the data collected by the two methods may be algorithmically combined in an image processor to detect a characteristic of the object 200 or residual substance 602. In general, residual substances 602, object 200, surface wrinkles, OIs, IOs and other substances within object 200 or container 201 may all be regions of interest used in determination of a characteristic of object 200.

Referring again to FIG. 6, the wrinkled surface object 200 may lie on and be in contact with a partially reflective surface (or "plate 600") with the inspection zone 42. A coherent optical beam 24 is incident on the object 200 such that the incident optical beam 24 is substantially perpendicular to the plate 600 and the wrinkled surface. In one embodiment, the plate 600 is flat to within a fraction of a wavelength. In one embodiment, the object may be within a container 201 (i.e., an envelope container) and the container may be comprised of plate 600 but it is to be understood the apparatus and methods herein can be used to characterize the object 200 whether or not it is in a container. The wrinkled surface gives rise to a distance 601 between a spatial region on the object 200 and the surface of the plate 600, substantively in the direction of propagation of the optical beam 24, which varies across the surface of the object 200. If the object 200 is also at least partially reflective, transmission of a coherent optical beam 24 through the object and plate 600 may be modulated by optical interference that is a function of the local separation distance (i.e., as in a Fabry-Perot etalon), the wrinkle and surface reflectivities and the local angle of incidence between the optical beam 24 and the wrinkle, or the optical beam 24 and the partially reflective (or transmissive) plate 600. The imaging sensor 58 can thereby detect the properties of the wrinkles, object 200 and any residual substance 602 (i.e., height, reflection, absorption, density, optical index, wrinkle cross sectional or spatial profile) across the object 200 surface.

In one embodiment, the THz imaging signal includes a spatial variance of absorbance across the object 200 and a variation of signal due the wrinkled surface of the object 200, and motion of the object 200 enables separation of the absorbance and wrinkled surface signals for characterization of the object 200.

The embodiment, or methods associated therewith, may include one of more of the following:

1) Taking a first measurement with the object 200 in a first position relative to a first plate 600 surface;
2) taking a second measurement with the object 200 in a second position relative to the first plate 600 surface;
3) using the first and second measurement to determine a characteristic of the object 200.

In a second embodiment, the method steps defined above are used, wherein in the first position, the object 200 resides on the first plate surface, the first measurement contains spatially variant optical transmission resulting from optical interference, the second position wherein the object is at least partially separated from the first plate surface and the second measurement contains less spatially variant coherent optical transmission than the first measurement, and the second measurement is used algorithmically as an offset image for the first measurement to determine a characteristic of the object.

In a third embodiment, the method steps above are used, and a second plate surface or probe is in contact with or in close proximity to the upper surface of the object 200 to create optical interference between the object 200 and the second plate for measurement and use in signal and image processing for object characterization.

In a fourth embodiment, the third embodiment is modified, wherein the distance between the first plate surface and second plate surface is changed in order to change the height of the wrinkles (e.g., compression or elongation of the wrinkles in a direction substantively parallel to, or orthogonal to, the direction of propagation of the optical beam 24), and thereby change the optical transmission or reflection of the optical beam 24 for use in signal and image processing.

In a fifth embodiment, the fourth embodiment is modified above wherein either (1) the second plate surface is optically transparent and optical transmission differences result from optical interference between the first plate surface and the object 200, or (2) the first plate surface is optically transparent and the optical transmission differences result from optical interference between the second plate surface and the object 200.

In a sixth embodiment, any of the previous embodiments may be modified, such that a separation difference between any of the first plate surface, object 200 and second plate surface is time variant and multiple measurements over time are processed to determine an object characteristic.

In a seventh embodiment, the method described above is utilized and the first plate surface in contact with the object 200 has a spatially variant surface height, the object 200 is moved over the surface in a direction perpendicular to the direction of propagation of the optical beam 24 over time, and a series of measurements over time are processed to determine an object characteristic.

In an eighth embodiment, the seventh embodiment is modified, wherein the surface height profile of the first plate surface is known and the known height profile is image processed to determine an object characteristic.

In a ninth embodiment, the method described above is utilized and the optical beam 24 has swept frequencies, or measurements are taken at multiple frequencies.

In a tenth embodiment, the third embodiment is modified, wherein the second plate surface is smaller than the object 200, and the second plate surface is moved to apply pressure at different spatial locations over the surface of the object 200 over time.

In an eleventh embodiment, the method above is utilized and wherein an object surface is a surface of a container or subcontainer, and a second object is contained within the same. In this embodiment, the object to be characterized is the surface of the second object.

In a twelfth embodiment, the method above is utilized and the reflectivity of the container surface or other optical property is changed by application of a substance or material (e.g. by application of an index matching material as known in the art as anti-reflective coatings).

In a thirteenth embodiment, the plate surface is created by a method substantially the same method as used to wrinkle the object, and the method for creating the wrinkled object is estimated by analysis of the image.

In a fourteenth embodiment, the object surface is heated to induce a temporary or permanent change in the object wrinkle profile, with the heating being performed either prior to or while in the inspection zone of the optical beam 24.

In a fifteenth embodiment, the first plate surface or the second plate surface is a platform of the object scanning apparatus.

In a sixteenth embodiment, the object 200 is moved in the direction of propagation of a collimated optical beam 24, the object 200 remains substantively in focus throughout the range of motion, and a sequence of images are processed to detect changes in optical interference and determine a characteristic of the object 200.

In a seventeenth embodiment, the object 200 is moved in the direction of propagation of a converging or diverging optical beam 24, the object 200 remains within the depth of field, and a sequence of images are processed to detect changes in optical interference and determine a characteristic of the object 200.

In an eighteenth embodiment, the object 200 is moved in the direction of propagation of a converging or diverging optical beam, the object 200 is moved outside the depth of field to achieve a degree of defocus, the degree of defocus optionally determined in a feedback loop of process images, and a sequence of images are processed to detect changes in optical interference and determine a characteristic of the object 200.

In a nineteenth embodiment, the object 200 is moved in the direction of propagation of a converging or diverging optical beam, the object 200 is moved outside the depth of field to achieve a degree of defocus, the degree of defocus determined to achieve resolution (i.e. blur) at least partially determined by a property of optical interference with the object 200, and a sequence of images are processed to detect changes in optical interference and determine a characteristic of the object 200.

In a twentieth embodiment, the spatial distribution of a variance in transmissivity or reflection from the object 200 in a direction orthogonal to the direction of propagation of the optical beam 24 is used to characterize the object 200, a chemical substance of the object 200 or a process by which the chemical substance was added to the object 200.

In another embodiment, water or oil is used to apply a chemical to the object.

In another embodiment, the distance between spatial transmissivity or reflection variations (e.g. maximums, minimums or thresholds) are used to characterize the object, chemical substance or process.

In another embodiment, an image processer determines the minimum absolute deviation, maximum absolute deviation or average absolute deviation of a sequence of images, the images acquired by the sensor at different positions of the object 200 within the inspection zone.

The apparatus and methods for wrinkle detection and object characteristic determination can be more generally applied to objects and interfering objects that have surfaces that result in static or dynamic optical interference (i.e., changing due to motion, changing pressure or other changes in container or object physical environment). For example, cavities such as those created to hold illicit materials (e.g., books, magazines, blocks and other materials any of which can have carved out to create such cavities). Such surfaces may create optical interference detectable through the incident optical beam and sensor of the object scanning device. Motion of the container or object, or applied pressure, may change the optical interference, and the same methods, such as using a first position as a reference and the difference between and first and second image to detect the cavity or subsurface feature.

Application of an External Force

Figure 7:
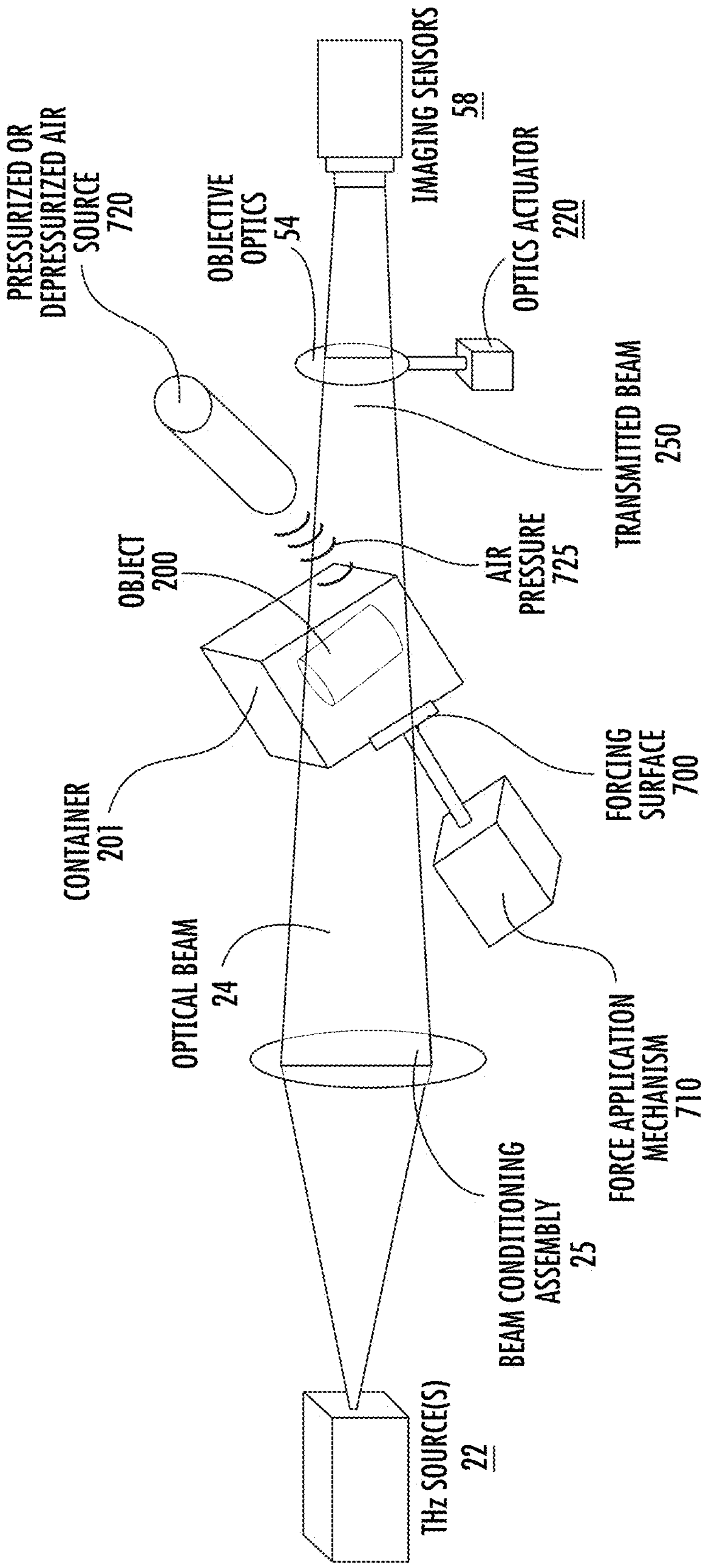
FIG. 7 shows the imaging apparatus with a forcing mechanism according to one embodiment.

In one embodiment, shown in FIG. 7, an external mechanical force may be applied to the container 201. The external force may be applied by a force application mechanism 710, such as a mechanical means, for example by pressing down on a container 201 (e.g., a paper containing envelope container) with a forcing surface 700 (e.g., a flat pressure plate). The forcing surface 700 may be flat and smaller than the container planar dimension, or with a planar dimension at least as large as a container planar dimension such that the external force is simultaneously applied over an entire surface of container 201 (e.g. in one embodiment the container 201 is compressed between forcing surface 700 and primary inspection window 40). The forcing surface 700 may be made of a material transparent or partially reflective to the optical beam 24 on one or more surfaces (e.g., certain plastics) to the THz radiation. The forcing surface 700 may have a structured surface that is designed to apply pressure at different spatial positions across the container 201 over time. The surface variations may be random in nature, periodic in nature, or be matched to provide enhanced detection of a probably feature of the object and thus enhanced determination. In one embodiment, spatial variations on the surface of the forcing surface 700 may have a periodicity that is correlated with the spatial variations of the transmissivity of the object of interest.

The forcing surface 700 may be designed to introduce a change in the optical beam amplitude, frequency content or phase, as may, for example, be introduced by the reflectivity of the plate surfaces to create Fabry-Perot or Gires-Tournois etalon.

The external force may change the interaction of the container 201, interfering objects or a container object 200 with the optical beam 24 and enable certain characteristics of the object 200 to be better determined. For example, an envelope may contain multiple sheets of paper, or folded paper, with "air gaps" between the sheets, and applying an external force may reduce or eliminate the air gaps and any reflectance, absorbance or coherent radiation effects (e.g., optical interference) resulting from the air gaps. In this manner, the transmission through the container and object, or reflection from the container or object, or magnitude of coherence signals resulting from the air gaps, may also be changed thereby increasing the signal to noise ratio of the sensor output or the system's ability to either detect air gaps or a characteristic of the object (e.g. the presence of a paper feature or chemical. It should be noted that air gaps are not required to create coherent beam: interference but only that the optical distance between surfaces be changed, such as might result from compression of a material, change in reflectance or absorption, or a change in index. In one embodiment, the wrinkled surface of the container, interfering object or object 200 is substantially eliminated (i.e., "flattened") along with the associated optical interaction with the incident beam, and the sensor data with and without the wrinkle elimination analyzed (e.g., differenced) to determine an object characteristic.

The external force applied may be at a predetermined level or may be varied over time (e.g. periodic, stepped or ramped). The external force level applied may be determined in a feedback loop comprised of an actuator applying a variable pressure and the output of the radiation detector. The compressive force may be measured and used in characterizing the container, object or interring materials.

In one embodiment, pressure may be applied without introducing a material (i.e., a forcing surface 700 or mechanical probe) into the inspection zone that interacts substantively with the optical beam. This ensures that a sensor only measures change in the container 201 or object 200 due to the applied pressure without the introduction of absorption, reflection or diffraction introduced by additional material (e.g. forcing surface 700) into the optical beam 24. The external force may be applied with a pressurized or depressurized air source 720 to deliver air pressure 725. This may be performed using pressurized or moving air or vacuum (e.g. by putting an envelope into a substantially optical beam transparent "bag" and evacuating air from the bag (or pressurizing the bag) such that a change in pressure is applied to the container, object or both). The external force may be applied with sound waves, including frequencies outside the human audible range. The sound waves may travel through the container 201 to the object 200, and change a characteristic of the object that may be measured with the imaging radiation. Thus, in this embodiment, the force application mechanism 710 comprises a pressurized or depressurized air source 720, or a source of sound waves, that may vary over time.

More generally, the embodiment includes an apparatus and method by which a change is induced in the container 201 or object 200, wherein the means of introducing the change does not in itself substantively interact with the optical beam 24. The change means may be created by or transmitted through a transparent gas or medium (including atmospheric air gases), such as may be applied by a pressurized or depressurized air source 720, such as a nozzle or fan outside the inspection zone blowing on the container 201 with ambient, hot, or cold air, or by a sound wave, each with the purpose of applying a force to the container 201 or object 200. The gas may be applied to a spatial region on the container 201, to the entire container, or to the entire inspection zone. The air direction may in a direction parallel or orthogonal to the direction of optical beam propagation, or may vary in angle. The air direction may be fixed relative to the object scanning apparatus and be part of the apparatus, and the container moved relative to the apparatus. The applied change may vary in time, and a sequence of sensor measurements may be taken over time and processed to determine an object characteristic. The induced change in the container 201 or object 200 may include a change in temperature, dimensional change, or another change in physical or optical property detectable by sensors. While air pressure change has been described here more fully, the embodiment is intended to include other methods of inducing change from outside the inspection zone, included electromagnetic radiation and electromagnetic fields as might be applied by a directed coherent or incoherent optical beam, magnetic coils and similar such emitters.

Thus, both the forcing surface 700, the pressurized gas and other such mechanisms purposed to induce a physical change in the dimensions or geometry of the container 201 or object 200 within the inspection zone for the purpose of hidden object characterization by the object scanning apparatus may be considered embodiments herein.

In one embodiment the object 200 is contained within container 201, and the force is applied to the object 200 by changing a physical property of the container.

The relaxation time of the container 201 or object 200 after removal or change in pressure may be used to determine a characteristic of an object (e.g., water content). The shape of the object with and without pressure may be used to characterize the object. Applying and removing pressure while creating an image of the object with and without pressure, and differencing the two images to create a difference image may be used to detect the pressure induced feature change. A sequence of more than two images over time may be used to determine a feature change. In another embodiment, an absolute deviation of each of a sequence of images may be used to detect an object characteristic (e.g. regions of differential transmission or absorption or wrinkles in a container envelope's object of interest as described in prior embodiments.

In one embodiment, the forcing surface 700 may be at a different temperature than the container, or the applied pressure may be the weight of the pressure plate. Images over time of the container 201 may then be compared to determine changes in object characteristics starting before the forcing surface 700 is applied, during the time it is applied (since the forcing surface 700 is transparent to THz radiation) and after its removal to measure characteristic changes resulting from one or both of the applied pressure and applied temperature difference. Just as pressure may be varied, the temperature of the forcing surface 700 may be varied over time.

Pressure may be applied at specific spatial regions of the container 201 in order to induce a change in a container object characteristic. The characteristic change may be motion of fluid in a subcontainer (e.g., fluid motion from an area of high pressure to an area of low pressure within a subcontainer).

Figure 5:
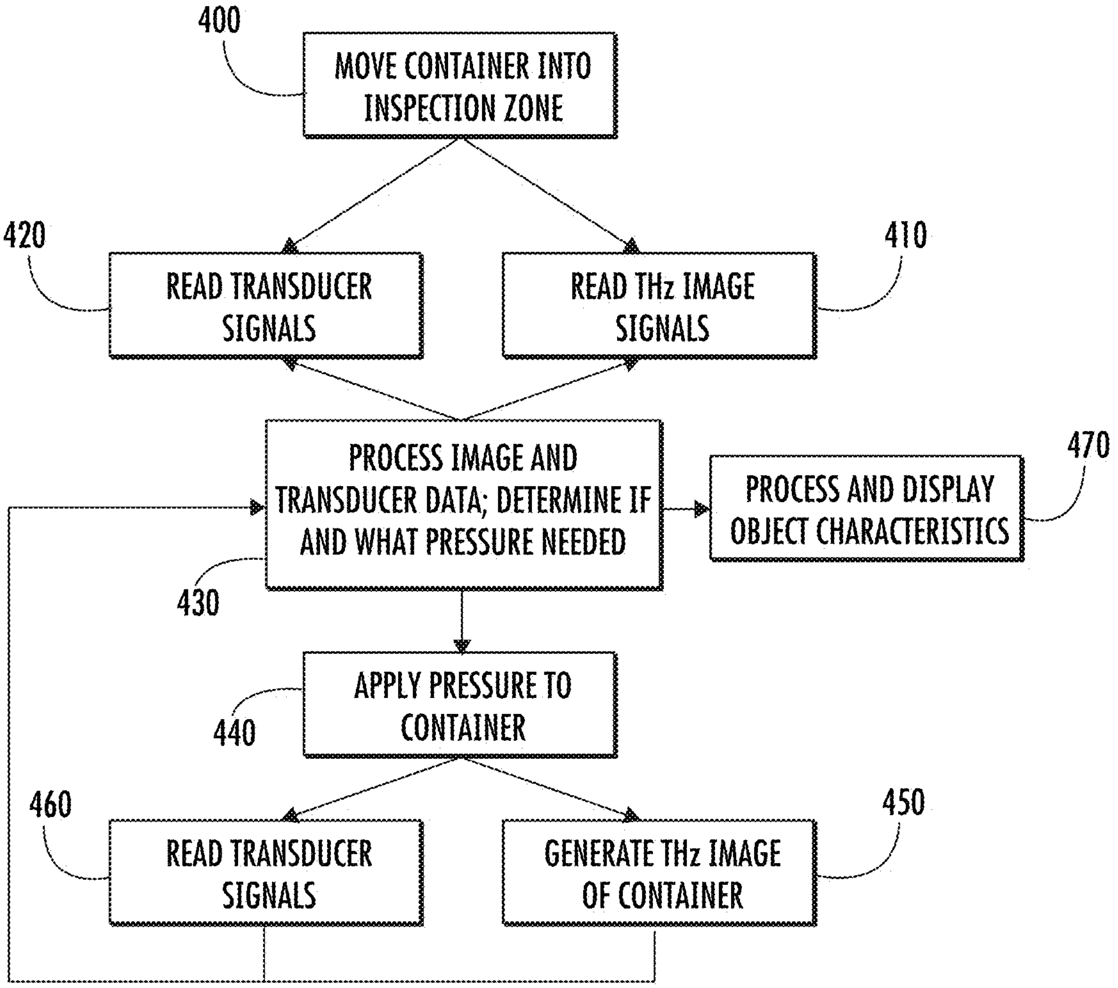
FIG. 5 shows a method of using pressure to determine a characteristic of an object.

The object scanning apparatus may follow a method as shown in FIG. 5, that includes at least some of the following steps:

1. Position a container 201 (or object 200) in the inspection zone (Box 400)
2. Perform a scan of the container and collect THz sensor data, and if applicable, other transducer data (Boxes 410-420)
3. Process image and transducer data; determine if pressure is to be applied, and if applicable, the pressure level, shape and spatial position. (Box 430)
4. Apply pressure to the container 201 (Box 440)
5. Optionally repeat the preceding two steps for as many iterations as determined in the sensor analysis as found to be desired. (Boxes 430-460)
6. Determine a characteristic of the object.
7. Display object characteristics. (Box 470)

The characteristic of the paper to be measured with the optical beam through the application of force and the analysis of the imagery may combine the amount of force applied the container, the physical characteristics of the container when subject to a force (e.g. stiffness, resiliency), amount of time the force is applied and force vector relative to the container, all to determine a characteristic of the paper through analysis of the changes induced in the images before, during and after the application of the force in a sequence of images. The characteristics may include many of the characteristics of paper as known in the art, including stiffness, bending radius, mechanical, structural or moisture curl, dimensional stability and resiliency. These characteristics may be used to determine if the paper has been treated in some manner, such as the infusion of a chemical into the paper.

Alternatively, the information collected above may be transmitted to a separate processing unit for further processing.

Container and Object Pre-Conditioning

In another embodiment, the container 201 may be conditioned or subjected to a controlled environment before or during the object scanning. In one embodiment, the conditioning may include placing the container 201 in a controlled temperature environment to either raise or lower its temperature. In another embodiment, the container 201 may be placed in a humidity controlled environment, or an environment to control both temperature and humidity. In yet another embodiment, the container 201 may be subjected to the application of an external electromagnetic field, which may include infrared radiation. In another embodiment, the composition of the environment may be varied such as by the use of an inert gas or partial or total immersion of the container 201 in a liquid. In one embodiment, the pressure of the environment may be varied to subject the container 201 to pressures above or below atmospheric pressure. The conditioning may be for a fixed period of time or a variable period of time based on feedback from sensors, such as temperature, pressure, humidity, gas composition sensors, and the like.

In one embodiment, the conditioning may be used to reduce the influence of IOs on the subsequent measurements, such as induced by temperature or humidity, by ensuring the temperature or humidity of the container is within a pre-determined range prior to conducting the measurements or THz imaging.

In another embodiment, the time varying changes in the THz image and/or ancillary sensor measurements may be monitored during or after container conditioning to further characterize the OIs within the container.

The pre-conditioning may occur separately from the object scanning apparatus shown in FIGS. 1A-1D or be integrated with the apparatus.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An container scanning apparatus, comprising:
- a terahertz source for generating a propagated optical beam;
- an inspection zone in which the propagated optical beam interacts with the container;
- at least one imaging sensor for collecting the optical beam from the inspection zone;
- first field optics configured to create an imaging sensor first image view with a first depth of field and a first magnification within the inspection zone;
- second field optics configured to create an imaging sensor second image view with a second depth of field and a second magnification within the inspection zone, the second depth of field being less than the first depth of field and the second magnification being greater than the first magnification;
- an imaging sensor configured to collect first imaging signals from the first image view and second imaging signals from the second image view;
- and an image processor for processing the first imaging signals and second imaging signals to determine a characteristic of the container.

2. The container scanning apparatus of claim 1, wherein the container contains an object of interest and an interfering object, and the image processor processes the first imaging signals to select the object of interest in the container.

3. The container scanning apparatus of claim 2, wherein the image processor processes the second imaging signals to determine a characteristic of the object of interest.

4. The container scanning apparatus of claim 2, wherein the image processor determines a three-dimensional position of the object of interest relative to the container.

5. The container scanning apparatus of claim 2, wherein the container scanning apparatus operates in transmission mode for one of the first image view or second image view and in reflection mode for the other of the first image view or second image view.

6. The container scanning apparatus of claim 5, wherein a second imaging sensor collects the first imaging signals or second imaging signals for processing by the image processor, the second imaging sensor being located in a different spatial location in the container scanning apparatus than the imaging sensor in order to collect complementary information.

7. The container scanning apparatus of claim 2, wherein a second terahertz source generates a second propagating optical beam at a different terahertz frequency than the terahertz source, the image sensor collecting imaging signals from the second propagating terahertz beam, and the image processor determines a spectroscopic characteristic of an object in the container.

8. The container scanning apparatus of claim 1, wherein a second terahertz source generates a second propagating optical beam, the optical beam being substantively coherent radiation and the second optical beam being substantively incoherent radiation.

9. The container scanning apparatus of claim 1, wherein the terahertz source is comprised of an array of emitters, and the optical beam is substantively coherent for the first image view and substantively incoherent for the second image view.

10. A method of scanning a container, comprising steps of:
- generating, with a terahertz source, a propagated optical beam;
- directing the propagated optical beam into an inspection zone in which the propagated optical beam interacts with an object in the container;
- collecting, with at least one imaging sensor, the optical beam from the inspection zone;
- creating a first image view of the inspection zone with a first depth of field and a first magnification;
- creating a second image view of the inspection zone with a second depth of field and a second magnification, the second depth of field being less than the first depth of field and the second magnification being greater than the first magnification;
- collecting with the at least one imaging sensor, first imaging signals from the first image view and second imaging signals from the second image view; and
- processing, with an image processor, the first imaging signals and second imaging signals to determine a characteristic of the container.

11. The method of claim 10, further comprising the step of processing the first imaging signals to select an object of interest in the container from among interfering objects in the container.

12. The method of claim 11, further comprising the step of processing the first imaging signals or second imaging signals to determine a characteristic of the object of interest.

13. The method of claim 11, wherein the step of collecting the first imaging signals or second imaging signals comprises determining a three-dimensional position of the object of interest relative to the container.

14. The method of claim 11, further comprising the step of operating in transmission mode for one of the first image view or second image view and in reflection mode for the other of the first image view or second image view.

15. The method of claim 14, further comprising the step of collecting the first imaging signals or second imaging signals with a second imaging sensor located at a different spatial location to obtain complementary information for processing by the image processor.

16. The method of claim 10, further comprising the step of generating a second propagating optical beam with a second terahertz source, wherein the optical beam is substantively coherent radiation and the second optical beam is substantively incoherent.

17. The method of claim 10, wherein the step of generating the propagated optical beam comprises operating an array of emitters such that the optical beam is substantively coherent for the first image view and substantively incoherent for the second image view.

18. The method of claim 10, further comprising the steps of generating a second propagating optical beam at a different terahertz frequency than the first propagating optical beam, collecting imaging signals from the second propagating optical beam with the at least one imaging sensor, and processing the imaging signals from the first propagating optical beam and second propagating optical beam to determine a spectroscopic characteristic of an object in the container.

* * * * *